United States Patent
Sonoda et al.

(10) Patent No.: US 7,227,599 B2
(45) Date of Patent: Jun. 5, 2007

(54) DISPLAY DEVICE AND MANUFACTURING METHOD OF THE SAME

(75) Inventors: Hiroyuki Sonoda, Ome (JP); Shingo Ishizaka, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 145 days.

(21) Appl. No.: 10/868,869

(22) Filed: Jun. 15, 2004

(65) Prior Publication Data

US 2004/0257496 A1    Dec. 23, 2004

(30) Foreign Application Priority Data

Jun. 20, 2003   (JP)   ............................. 2003-175731

(51) Int. Cl.
*G02F 1/1335*   (2006.01)
(52) U.S. Cl. ........................ 349/95; 349/113; 349/114
(58) Field of Classification Search ................ 349/95, 349/114, 113
See application file for complete search history.

(56) References Cited

U.S. PATENT DOCUMENTS

| | | | |
|---|---|---|---|
| 5,151,801 A * | 9/1992 | Hiroshima .................... 349/95 |
| 5,276,538 A | 1/1994 | Monji et al. |
| 5,455,694 A * | 10/1995 | Ariki et al. .................... 349/95 |
| 5,574,701 A | 11/1996 | Harilela |
| 5,581,379 A * | 12/1996 | Aoyama et al. ............... 349/5 |
| 5,808,712 A | 9/1998 | Hishida et al. |
| 5,990,992 A * | 11/1999 | Hamanaka et al. ........... 349/95 |
| 6,078,372 A * | 6/2000 | Kim ........................... 349/106 |
| 6,172,723 B1 * | 1/2001 | Inoue et al. ................... 349/95 |
| 6,201,770 B1 | 3/2001 | Arikawa et al. |
| 6,469,683 B1 * | 10/2002 | Suyama et al. ............... 345/32 |
| 6,822,707 B2 * | 11/2004 | Ariyoshi et al. ............ 349/112 |
| 6,924,856 B2 * | 8/2005 | Okumura et al. ............. 349/96 |
| 6,989,874 B2 * | 1/2006 | Chae ........................... 349/95 |

FOREIGN PATENT DOCUMENTS

| | | |
|---|---|---|
| JP | 03-288801 | 12/1991 |
| JP | 11-151375 | 6/1999 |
| JP | 2001-215531 | 8/2001 |

\* cited by examiner

*Primary Examiner*—Toan Ton
(74) *Attorney, Agent, or Firm*—Frishauf, Holtz, Goodman & Chick, P.C.

(57) ABSTRACT

A display device of the invention relates to a display device capable of three-dimensionally representing display on a liquid crystal display element without a hologram. The display device includes a liquid crystal display element and a lens panel. The liquid crystal display element includes a plurality of transparent electrodes on opposed surfaces of a pair of transparent substrates between which a liquid crystal is provided. The lens panel is disposed on the bottom surface side of the liquid crystal display element, and has a plurality of lens portions. The respective lens portions are disposed in regions where the transparent electrodes correspond to each other, and formed in the same shape as that of the respective regions. When displaying information, e.g., a number and a character, on the liquid crystal display element, the information itself can be represented three-dimensionally through the lens portions. Thus, highly decorative display can be obtained.

15 Claims, 30 Drawing Sheets

DISPLAY DEVICE AND MANUFACTURING METHOD OF THE SAME

BACKGROUND OF THE INVENTION

1. Field of the Invention

The present invention relates to a display device which is useful when applied to various kinds of devices such as a watch, a calculator, a cellular phone, and meters of a car, and a manufacturing method of the same.

2. Description of Related Art

With regard to electronic watches, there have been digital watches based on earlier development which electro-optically display information, e.g. time, by using a display device, and the displayed information can be seen from outside a watch case through a watch glass. The display device includes a liquid crystal display element, and is provided inside the watchcase such that it corresponds to the watch glass attached to the watchcase.

The display device used in such electronic watches comprises a liquid crystal display element which includes: a transparent electrode provided on each of opposed surfaces of a pair of upper and lower transparent substrates; a liquid crystal provided between the pair of substrates; and a polarizer provided on the top surface of the upper substrate and the bottom surface of the lower substrate. A semi-transmissive reflector, a fluorescent layer and a backlight element are disposed in this order beneath the liquid crystal display element. The fluorescent layer is one that generates fluorescence in the visible light range in response to light in the ultraviolet range, and is provided on the bottom surface of the semi-transmissive reflector. The backlight element is an element of a surface-emitting type such as an EL element (electro-luminescence element), and light emitted therefrom is transmitted through the fluorescent layer and the semi-transmissive reflector to illuminate the bottom surface side of the liquid crystal display element.

With this kind of display device for an electronic watch, external light enters through a watch glass in a light place, and the external light is transmitted through the liquid crystal display element. A part of the transmitted light is reflected by the semi-transmissive reflector, whereby information such as time becomes visible. The external light other than the reflected light is transmitted through the semi-transmissive reflector, and the fluorescent layer is irradiated with the transmitted light. The fluorescent layer is caused to emit light by light in the ultraviolet range contained in the external light, with which the fluorescent layer has been irradiated. The liquid crystal display element is illuminated also by the light emitted from the fluorescent layer, and the information can therefore be displayed brightly. In case of a dark place, when the backlight element is caused to emit light, the emitted light is transmitted through the fluorescent layer and the semi-transmissive reflector, and the bottom surface side of the liquid crystal display element is irradiated with the transmitted light. The information displayed on the liquid crystal display element thus becomes visible even in a dark place.

In such a display device, in case of a light place, external light is reflected by the semi-transmissive reflector, and fluorescent light in the visible light range is emitted by the fluorescent layer due to light in the ultraviolet range contained in the external light to illuminate the liquid crystal display element. In case of a dark place, the backlight element is caused to emit light to illuminate the liquid crystal display element. Information displayed on the liquid crystal display element thus becomes visible in both light and dark places. However, the information on the liquid crystal display element is displayed only two-dimensionally. Therefore, the mode of display is simple and not really decorative.

Meanwhile, a display device for a timepiece in which a hologram sheet is provided on the back surface side of a liquid crystal display element, and image information of the hologram sheet is represented three-dimensionally, has been known.

With such a display device, however, information displayed on the liquid crystal display element cannot be represented three-dimensionally, although the image information of the hologram sheet, which has been formed thereon beforehand, can be represented three-dimensionally. Moreover, use of the hologram sheet involves a problem that the manufacture thereof is difficult and cumbersome, and the display device is accordingly expensive.

SUMMARY OF THE INVENTION

An object of the invention is to provide a display device capable of three-dimensional display on a liquid crystal display element without a hologram sheet and thus capable of highly decorative display, and a manufacturing method of the same.

In order to achieve the aforementioned object, a display device according to the invention comprises: a liquid crystal display element having a flat plate shape where a transparent electrode to which a voltage is applied is provided on a transparent substrate; and a lens portion disposed on at least one of a front surface side and a back surface side of the liquid crystal display element. The lens portion and the transparent electrode are positioned to correspond to each other.

Another display device according to the invention comprises: a liquid crystal display element which includes a pair of transparent substrates, a pair of transparent electrodes on opposed surfaces of the pair of transparent substrates, and a liquid crystal provided between the pair of substrates; and a lens portion disposed on an outer side of at least one of a front surface and a back surface of the liquid crystal display element. The lens portion is disposed to correspond to at least a part of regions where the pair of transparent electrodes of the liquid crystal display element correspond to each other.

According to the invention, a lens portion disposed on an outer side of one of a front surface side and a back surface side of the liquid crystal display element is made to correspond to at least a part of the regions where the pair of transparent electrodes of the liquid crystal display element correspond to each other. When a voltage is selectively applied to the regions where the pair of transparent electrodes correspond to each other to have the ON regions E1, the ON regions E1 become a light-transmitting state. Information can be thus displayed on the liquid crystal display element. Moreover, the information displayed on the liquid crystal display element can be represented three-dimensionally through the lens portion. Thus, information displayed on the liquid crystal display element can be represented three-dimensionally, and hence highly decorative display can be obtained.

Another display device according to the invention comprises: a liquid crystal display element which includes a pair of transparent substrates, a pair of transparent electrodes on opposed surfaces of the pair of transparent substrates, and a liquid crystal provided between the pair of substrates; and a panel having a lens portion disposed on an outer side of at least one of a front surface and a back surface of the liquid crystal display element. The lens portion is disposed to correspond to at least a part of regions where the pair of transparent electrodes of the liquid crystal display element correspond to each other.

According to the invention, when disposing a panel on an outer side of one of a front surface side and a back surface side of the liquid crystal display element, the lens portion provided on the panel is made to correspond to at least a part of the regions where the pair of transparent electrodes of the liquid crystal display element correspond to each other. When a voltage is selectively applied to the regions where the pair of transparent electrodes correspond to each other to have the ON regions E1, the ON regions E1 become a light-transmitting state. Information can be thus displayed on the liquid crystal display element. Moreover, the information displayed on the liquid crystal display element can be represented three-dimensionally through the lens portion. Thus, information displayed on the liquid crystal display element can be represented three-dimensionally, and hence highly decorative display can be obtained.

Another display device according to the invention comprises: a liquid crystal display element which includes a pair of transparent substrates, a pair of transparent electrodes on opposed surfaces of the pair of transparent substrates, and a liquid crystal provided between the pair of substrates; and a panel disposed on a back surface side of the liquid crystal display element, the panel having a lens portion and a decorative layer. The lens portion and the decorative layer are disposed in a region other than regions where the pair of transparent electrodes of the liquid crystal display element correspond to each other.

According to the invention, the decorative layer is provided on at least one of the front surface side and the back surface side of the lens portion. Thus, the ON regions E1 can be represented three-dimensionally through the lens portion. In particular, decorative effects can be added through the decorative layer, whereby a variety of decorative effects can be obtained.

A manufacturing method of a display device according to the invention is a manufacturing method of a display device which comprises: a liquid crystal-display element which includes a pair of transparent substrates; a pair of transparent electrodes on opposed surfaces of the pair of transparent substrates; and a liquid crystal provided between the pair of substrates; and a panel having a lens portion disposed on an outer side of at least one of a front surface and a back surface of the liquid crystal display element, in which the lens portion is disposed to correspond to at least a part of regions where the pair of transparent electrodes of the liquid crystal display element correspond to each other. The manufacturing method comprises: a panel manufacturing step of providing the lens portion on the panel; and a panel attaching step of disposing the panel on the outer side of at least one of the front surface and the back surface of the liquid crystal display element in a state where the lens portion is caused to correspond to at least the part of the regions where the pair of transparent electrodes of the liquid crystal display element correspond to each other.

According to the invention, a panel manufacturing step of providing the lens portion on the panel, and a panel attaching step of disposing the panel on the outer side of at least one of the front surface and the back surface of the liquid crystal display element in a state where the lens portion is caused to correspond to at least the part of the regions where the pair of transparent electrodes provided on the pair of transparent substrates of the liquid crystal display element correspond to each other, are included. Thus, without fail, the lens portion of the panel are made to correspond to the part of the regions where the transparent electrodes of the liquid crystal display element correspond to each other, thereby facilitating the manufacture of the display device. In this way, when information is displayed on the liquid crystal display element, the information displayed on the liquid crystal display element can be represented three-dimensionally.

BRIEF DESCRIPTION OF THE DRAWINGS

FIGS. 9A and 9B show a lens panel in FIG. 7, in which FIG. 9A is an enlarged view showing a front side thereof, and FIG. 9B is an enlarged view showing a back side thereof;

FIGS. 16A, 16B and 16C show absorption axes of a display device in FIG. 15, in which FIG. 16A is an enlarged front view showing an absorption axis of an upper polarizer, FIG. 16B is an enlarged front view showing an absorption axis of a lower polarizer, and FIG. 16C is an enlarged front view showing an absorption axis of a polarizing film;

FIGS. 22A and 22B show modifications of the sixth embodiment where fine projections and recesses are formed on the surfaces of lens portions, in which FIG. 22A is an enlarged sectional view where the lens portions are formed integrally with the lens panel, and FIG. 22B is an enlarged sectional view where the lens portions are formed on the sheet and provided on the lens panel;

FIGS. 23A and 23B show a main part of modifications of the sixth embodiment where lens portions are formed in a trapezoidal shape, in which FIG. 23A is an enlarged sectional view where the trapezoidal lens portions are formed integrally with the lens panel, and FIG. 23B is an enlarged sectional view where the trapezoidal lens portions are formed on the sheet and provided on the lens panel;

FIGS. 24A and 24B show a main part of modifications of the sixth embodiment where fine projections and recesses are formed on the surfaces of the trapezoidal lens portions shown in FIG. 23A, in which FIG. 24A is an enlarged sectional view where the fine projections and recesses are formed only on the top surfaces of the trapezoidal lens portions, and FIG. 24B is an enlarged sectional view where the fine projections and recesses are formed only on both side surfaces of the trapezoidal lens portions;

FIGS. 29A, 29B and 29C show modifications of the eighth embodiment where decorative layers are provided on part(s) of respective trapezoidal lens portions on the top surface of a lens panel, in which FIG. 29A is an enlarged sectional view where the decorative layers are provided only on both side surfaces of the trapezoidal lens portions, FIG. 29B is an enlarged sectional view where the decorative layers of different types are provided on the top surface and side surfaces of the trapezoidal lens portions, and FIG. 29C is an enlarged sectional view where a first decorative layer is provided on the surface of the respective trapezoidal lens portions, and a second decorative layer is provided in the area on the first decorative layer corresponding to the top end surface of the respective trapezoidal lens portions;

FIGS. 45A, 45B and 45C show modifications of the embodiments and the modifications thereof where a plurality of types of lens parts different in shape and/or color are provided two-dimensionally on the top surface of the lens panel, in which FIG. 45A is an enlarged sectional view where a colored second lens part is provided between first lens parts, FIG. 45B is an enlarged sectional view where a colored semicircular second lens part is provided between semicircular first lens parts, and a colored trapezoidal fourth lens part is provided between trapezoidal third lens parts, and FIG. 45C is an enlarged sectional view where a high, colored trapezoidal second lens part is provided between the trapezoidal first lens parts, and a high, colored semicircular third lens part is provided between the trapezoidal first lens parts;

FIGS. 46A, 46B and 46C show modifications of the embodiments and the modifications thereof where a plurality of types of lens parts different in shape and/or color are stacked on each other on the top surface of the lens panel, in which FIG. 46A is an enlarged sectional view where a colored trapezoidal second lens part is provided on the top surfaces of some of a plurality of trapezoidal first lens parts, and a colored semicircular third lens part is provided on the top surfaces of the other first lens parts, FIG. 46B is an enlarged sectional view where a colored trapezoidal second lens part is provided on the concave top surfaces of some of a plurality of first lens parts, and a colored semicircular third lens part is provided on the top surfaces of the other first lens parts, and FIG. 46C is an enlarged sectional view where each colored trapezoidal first lens part and each colored semicircular second lens part is covered with a transparent third lens part;

FIGS. 48A, 48B and 48C show methods of forming lens portions on the lens panel in FIG. 47, in which FIG. 48A is an enlarged sectional view of a main part where the lens portions are formed integrally with the lens panel by injection molding, FIG. 48B is an enlarged sectional view of a main part where the lens portions of ultraviolet curable resin are formed on the lens panel by printing, and FIG. 48C is an enlarged sectional view of a main part where the lens portions are formed by embossing the lens panel;

DETAILED DESCRIPTION OF THE PREFERRED EMBODIMENTS

First Embodiment

Hereinafter, with reference to FIGS. 1 to 5, a description will be given of a first embodiment in which a display device of the invention is applied to an electronic watch.

Figure 1:
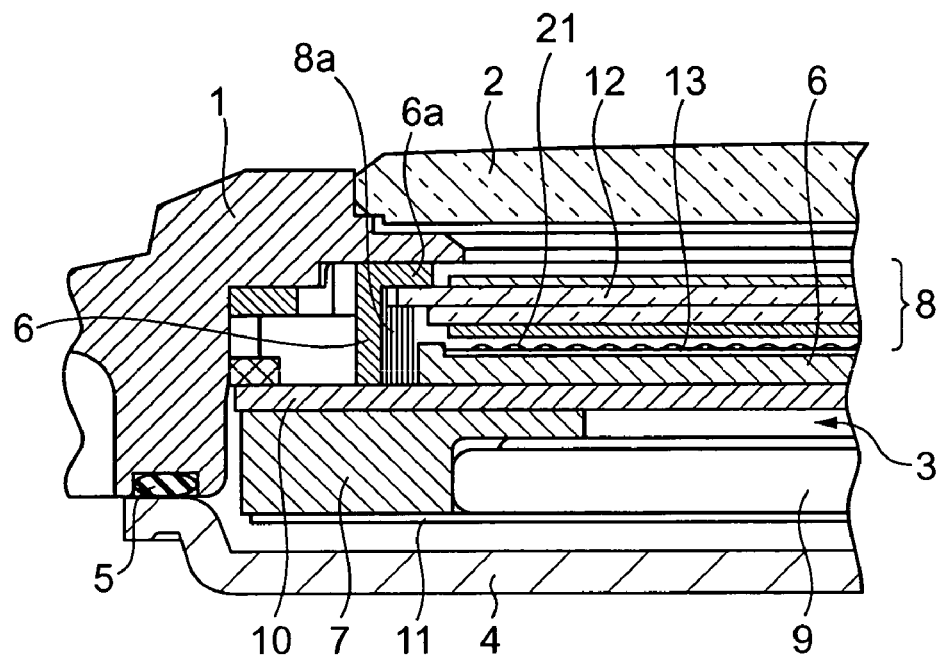
FIG. 1 is an enlarged sectional view of a main part of a first embodiment in which the invention is applied to an electronic watch.
Figure 2:
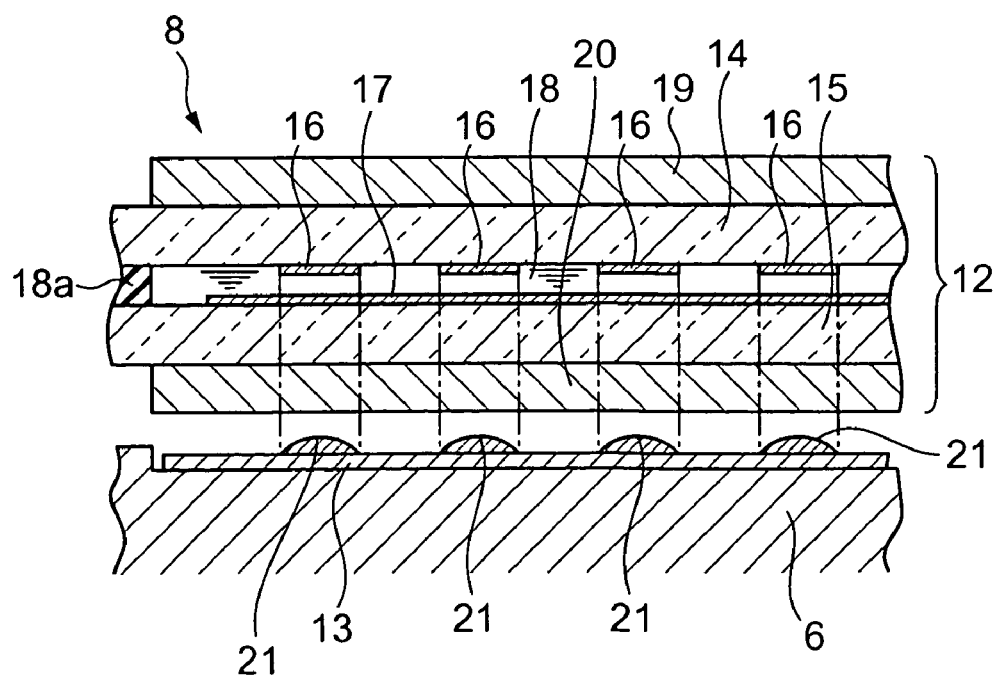
FIG. 2 is an enlarged sectional view of a main part showing a display device in FIG. 1.
Figure 3:
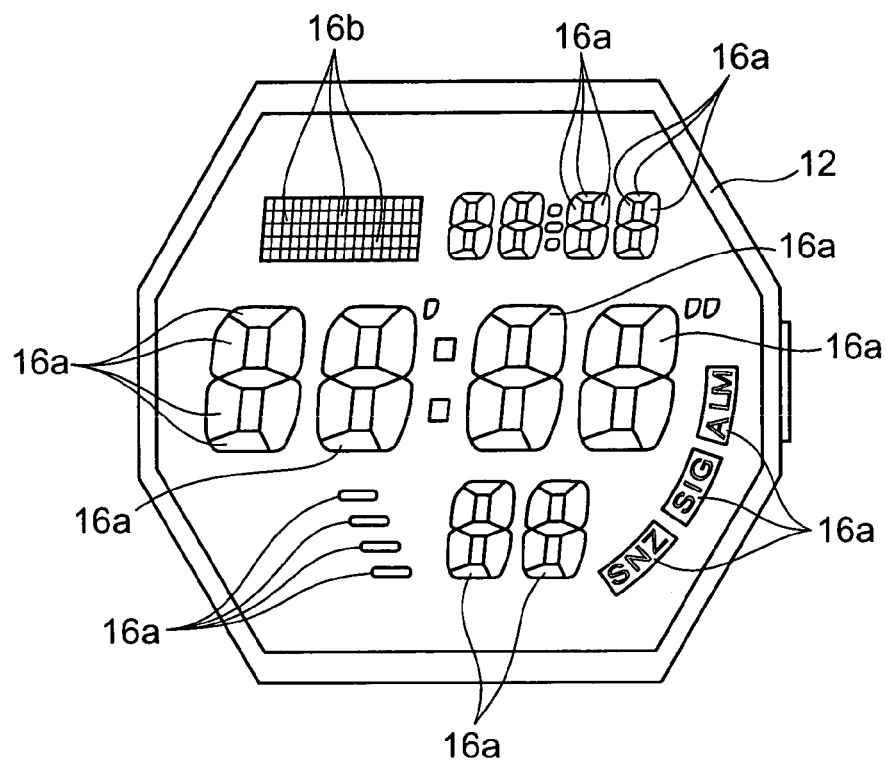
FIG. 3 is an enlarged front view showing a display pattern of a liquid crystal display element in FIG. 2.
Figure 4:
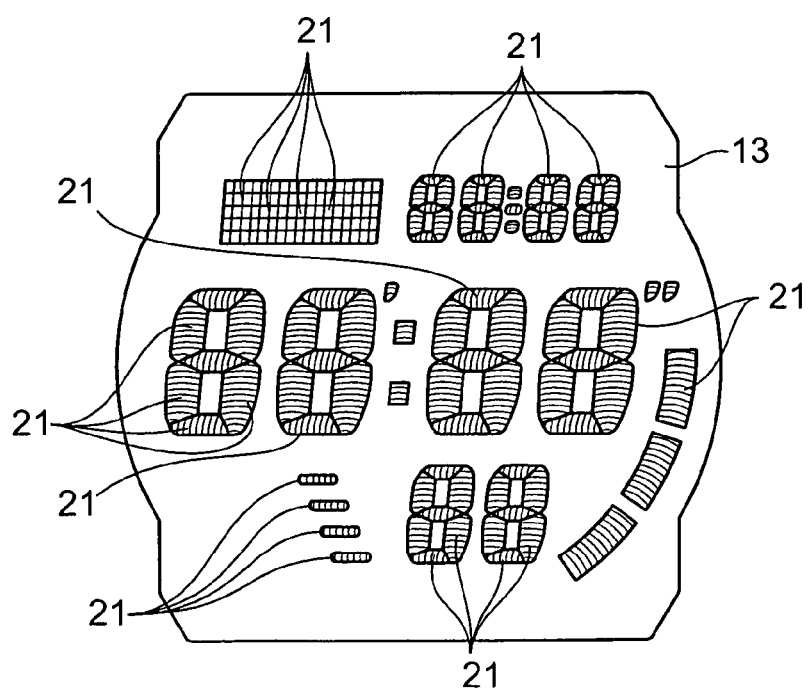
FIG. 4 is an enlarged front view showing a lens panel in FIG. 2.
Figure 5:
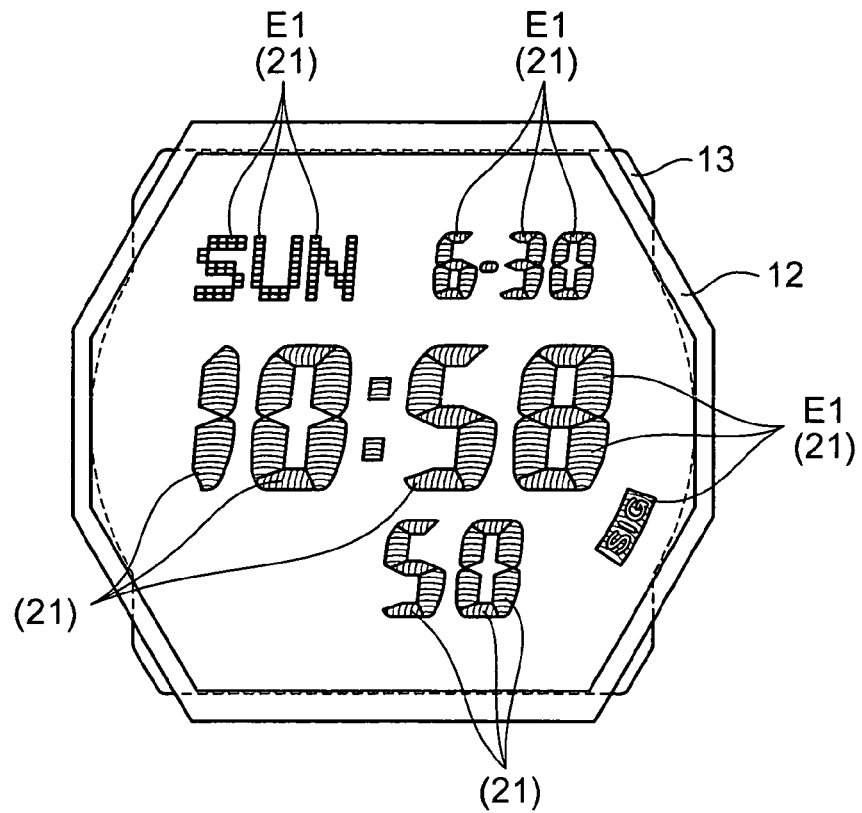
FIG. 5 is an enlarged front view showing a display state of the liquid crystal display element in FIG. 2.

FIG. 1 is an enlarged sectional view showing a main part of an electronic watch of the invention, FIG. 2 is an enlarged sectional view showing a main part of a display device thereof, FIG. 3 is a front view showing a display pattern of the display device in FIG. 2, FIG.4 is a front view of a lens panel in FIG. 2, and FIG. 5 is a front view showing a display state of the display device in FIG. 2.

This electronic watch includes a watchcase 1 as shown in FIG. 1. A watch glass 2 is attached to an upper portion of the watchcase 1, and a watch module 3 is contained in the watchcase 1. Further, a case back 4 is attached to a bottom portion of the watchcase 1 via a water-resistant ring 5.

As shown in FIG. 1, the watch module 3 includes at least a digital function out of a digital function to electro-optically display information such as time and an analog function to indicate time with hands that move above a dial. The watch module 3 includes an upper housing 6 and a lower housing 7. A display device 8 is disposed inside the upper housing 6 so as to correspond to the watch glass 2, and a battery 9 is disposed inside the lower housing 7. Moreover, a circuit board 10 is disposed between the upper and lower housings 6 and 7. The display device 8 is electrically connected with the circuit board 10 via an inter connector 8a, and the battery 9 is also electrically connected with the circuit board 10. The upper and lower housings 6 and 7 are attached to each other on a circuit supporter 11 disposed on the bottom surface of the lower housing 7.

The display device 8 includes a liquid crystal display element 12 (flat plate shape) and a lens panel 13 as shown in FIGS. 1 and 2. As shown in FIG. 2, the liquid crystal display element 12 has a pair of upper and lower transparent substrates 14 and 15 made of, e.g., transparent glass or transparent synthetic resin, and transparent electrodes 16 and 17 made of a transparent conductive material such as an indium tin oxide (ITO) are provided on opposed surfaces of the pair of substrates 14 and 15, respectively. Moreover, a liquid crystal 18 is sealed in between the pair of substrates 14 and 15 with a sealing material 18a. Polarizers 19 and 20 are provided on the top surface of the upper substrate 14 and on the bottom surface of the lower substrate 15, respectively, such that absorption axes (or transmission axes) thereof intersect each other at a predetermined angle. Thus, the display device 8 is formed to be of a negative type, in which ON regions E1 where the pair of transparent electrodes 16 and 17 between which a voltage is applied are opposed to (overlap) each other become a light-transmitting state.

In this case, the upper transparent electrode 16 of the pair of transparent electrodes 16 and 17 which is provided on the upper substrate 14 includes segment electrodes 16a and dot electrodes 16b as shown in FIG. 3. Some of the segment electrodes 16a are arranged to form a shape like an "8." The lower transparent electrode 17 on the lower substrate 15 forms a common electrode to have a shape corresponding to the segment and dot electrodes 16a and 16b. The liquid crystal 18 is of any one of the twisted nematic (TN) type with a twist angle of substantially 90 degrees, the hyper twisted nematic (HTN) type with a twist angle of substantially 120 degrees, and the super twisted nematic (STN) type with a twist angle of substantially 180 degrees or more. In the liquid crystal display element 12, the top surface of an end portion of the upper substrate 14 is in contact with the bottom side of a collar portion 6a of the upper housing 6, and the bottom surface of the end portion of the upper substrate 14 is supported by the inter connector 8a. In this state, the liquid crystal display element 12 is disposed inside the upper housing 6, and electrically connected with the circuit board 10 via the inter connector 8a.

The lens panel 13 is a transparent or translucent film having a light-transmissive property, and, as shown in FIG. 2, projected lens portions 21 each having a semicircular vertical cross-section are provided on the top surface thereof. Specifically, the lens portions 21 are provided in regions each substantially corresponding to the region where the upper and lower transparent electrodes 16 and 17 correspond to (overlap) each other, i.e., in regions substantially corresponding to the segment electrodes 16a of the upper transparent electrode 16. The lens portions 21 are not provided in regions corresponding to the dot electrodes 16b of the upper transparent electrode 16.

Ultraviolet curable resin is applied onto the lens panel 13 by printing such as silk-screen printing, and the lens panel 13 is irradiated with ultraviolet rays in this state, whereby the ultraviolet curable resin is cured. Thus, as shown in FIG. 4, each of the lens portions 21 is formed into substantially the same shape as that of the respective overlapping regions of the transparent electrodes 16 and 17, i.e., the respective segment electrodes 16a of the upper transparent electrode 16. Here, the lens portions 21 may be slightly larger or smaller than the segment electrodes 16a of the upper transparent electrode 16. The positions of the lens portions 21 may be slightly deviated from those of the segment electrodes 16a. The top surface of the upper housing 6 which the lens panel 13 faces, or the bottom surface of the lens panel 13, is made to be a reflective surface.

According to this kind of electronic watch, external light is taken into the watchcase 1 through the watch glass 2 in a light place, and the liquid crystal display element 12 of the display device 8 is irradiated with the external light that has been taken in. Thus, when the liquid crystal display element 12 is driven to display information such as time, the displayed information can be seen from outside the watchcase 1 through the watch glass 2. In other words, when the liquid crystal display element 12 is driven and a voltage is selectively applied between the transparent electrodes 16 and 17 of the pair of substrates 14 and 15, the ON regions E1 where the transparent electrodes 16 and 17 between which the voltage is applied overlap each other become a light-transmitting state, and information such as time is displayed by the ON regions E1 as shown in FIG. 5.

At this time, regarding the external light with which the liquid crystal display element 12 has been irradiated, only the external light with which the ON regions E1 of the liquid crystal display element 12 have been irradiated is transmitted through the liquid crystal display element 12 at points corresponding to the ON regions E1. The lens portions 21 of the lens panel 13 are then irradiated with the transmitted light. A part of the light with which the lens portions 21 have been irradiated is reflected off the surfaces of the projected lens portions 21, and the other part of the light passes through the lens portions 21, and is reflected off or from below the bottom surface of the lens panel 13 to be diffused above the lens portions 21. The light thus diffused and reflected from the lens portions 21 goes in reverse the above light path, and radiates above the liquid crystal display element 12. Thus, the information displayed on the liquid crystal display element 12 as shown in FIG. 5, i.e., the ON regions E1, is displayed brightly. Moreover, the information is displayed three-dimensionally in a semicircular convex shape through the lens portions 21. Consequently, the information itself that is displayed on the liquid crystal display element 12 can be represented three-dimensionally, and thus highly decorative display can be obtained.

Figure 6:
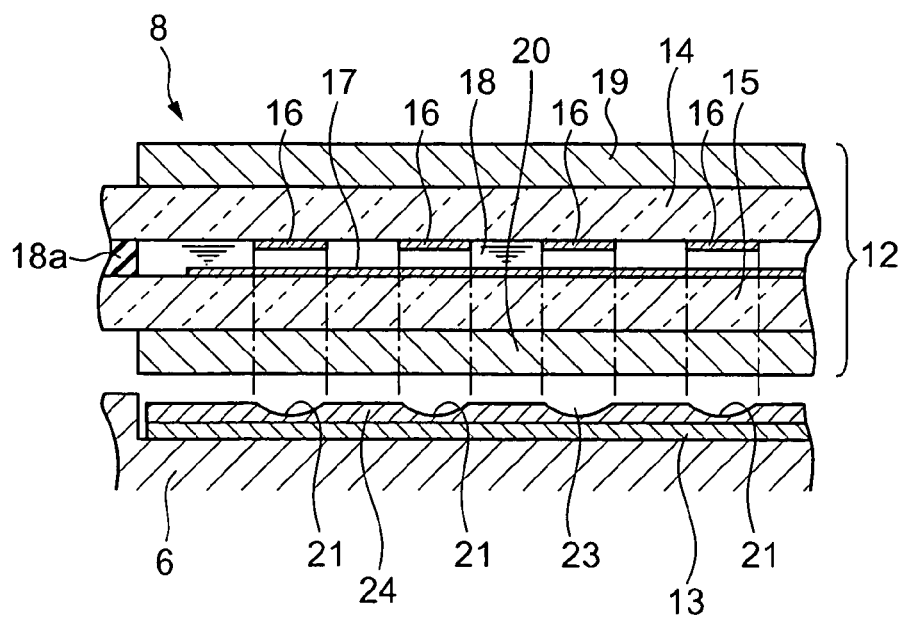
FIG. 6 is an enlarged sectional view of a main part showing a modification of the display device in which concave lens portions are used instead of projected lens portions in FIG. 2.

In the first embodiment, the projected lens portions 21 are provided on the top surface of the lens panel 13. However, the structure of the display device 8 is not limited thereto. For example, as shown in FIG. 6, recessed lens portions 23 each having a semicircular cross-section may be formed on a transparent or translucent sheet 24 having a light transmissive property. The sheet 24 is provided on the lens panel 13 such that the recessed lens portions 23 correspond to a part of the overlapping regions of the upper and lower transparent electrodes 16 and 17, i.e., to regions corresponding to the segment electrodes 16a of the upper transparent electrode 16. In this case, information displayed on the liquid crystal display element 12 is displayed three-dimensionally in a semicircular concave shape through the concave lens portions 23. Thus, as in the case of the first embodiment, the displayed information itself can be represented three-dimensionally, and highly decorative display can be thus obtained.

Second Embodiment

Next, a second embodiment in which the invention is applied to an electronic watch will be described with reference to FIGS. 7 to 10. The same portions as those of the first embodiment shown in FIGS. 1 to 5 are designated by the same reference numerals for explanation.

This electronic watch is structured such that the lens panel 13 is disposed below a liquid crystal display element 25, projected lens portions 26 are provided on the top surface of the lens panel 13, and decorative layers 27 are provided on the bottom surface of the lens panel 13. The liquid crystal display element 25 is formed to be of a positive type. The electronic watch otherwise has substantially the same structure as that of the first embodiment.

Figure 7:
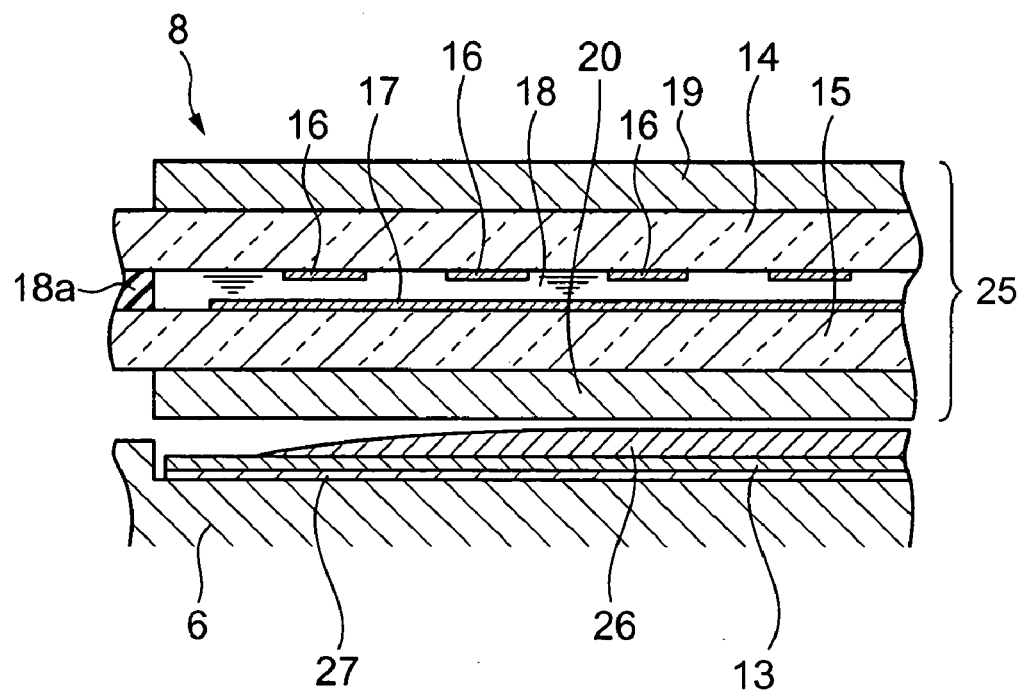
FIG. 7 is an enlarged sectional view of a main part showing a second embodiment of the invention.
Figure 8:
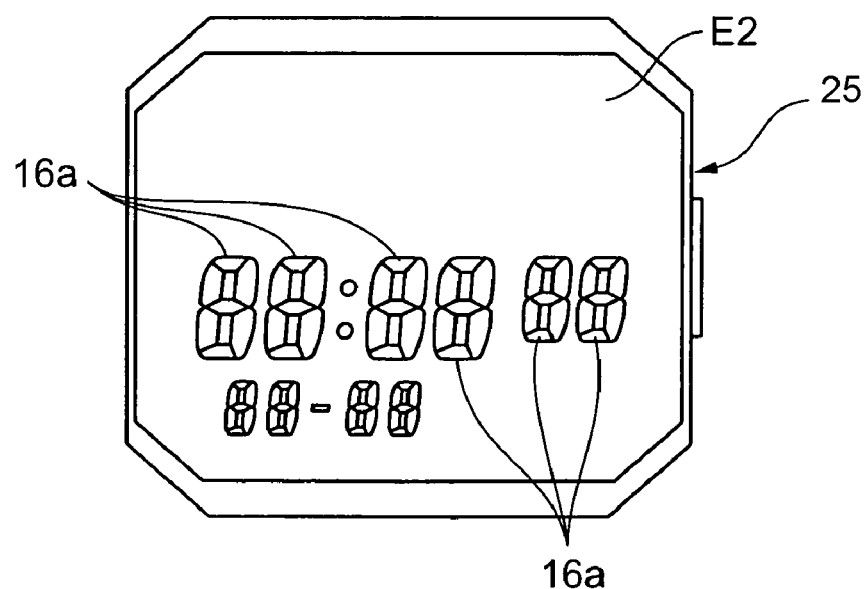
FIG. 8 is an enlarged front view showing a display pattern of a liquid crystal display element in FIG. 7.

As shown in FIG. 7, the liquid crystal display element 25 includes the pair of upper and lower transparent substrates 14 and 15, and the polarizers 19 and 20 are provided on the top surface of the upper substrate 14 and on the bottom surface of the lower substrate 15, respectively, such that the absorption axes (or transmission axes) thereof are substantially parallel to each other. Thus, the liquid crystal display element 25 is formed to be of a positive type, in which the ON regions E1 where the pair of transparent electrodes 16 and 17 between which a voltage is applied overlap each other become a light-blocking state. Moreover, the lens panel 13 is a transparent or translucent film having a light-transmissive property as in the case of the first embodiment, and the projected lens portions 26 each having a gently curved convex shape are formed integrally with the lens panel 13 on the top surface of the lens panel 13.

Figure 9A:
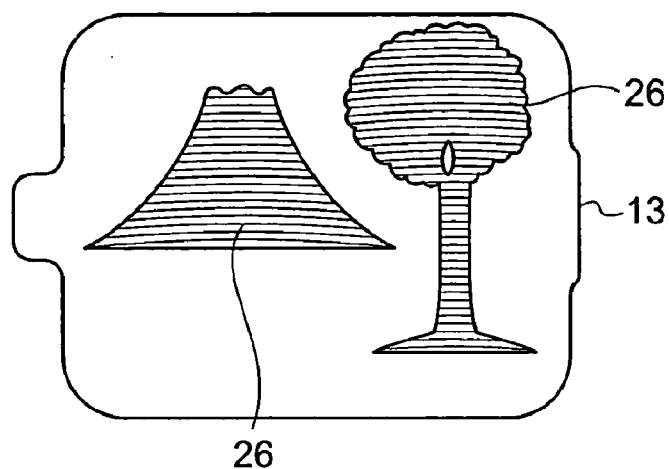
Figure 9B:
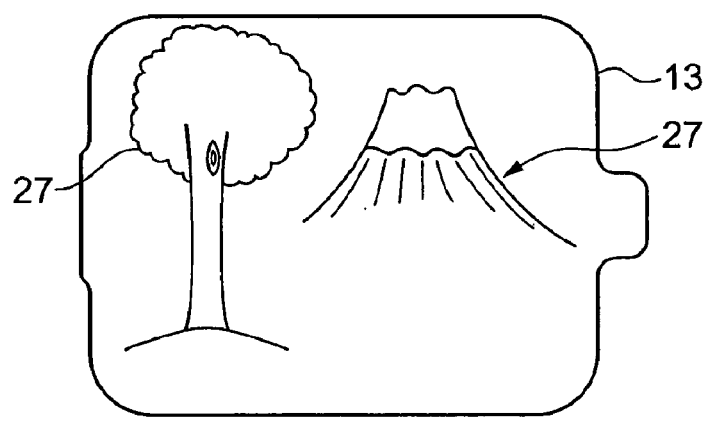

The lens portions 26 are provided so as to correspond to OFF regions E2, which are regions other than the ON regions E1 where the transparent electrodes 16 and 17 of the pair of substrates 14 and 15 overlap each other. In other words, the OFF regions E2 correspond to backgrounds of the ON regions E1 as shown in FIG. 9A. The respective lens portions 26 are in a gently curved convex shape. Moreover, as shown in FIG. 7, the decorative layers 27 on the bottom surface of the lens panel 13 are formed by using color ink layers, and formed to display a picture, a pattern, a figure, etc., in color, as shown in FIG. 9B. In this case, as shown in FIGS. 9A and 9B, the lens portions 26 and the decorative layers 27 are in substantially the same shape, and provided on the top and bottom surfaces of the lens panel 13, respectively, so as to correspond to each other.

Figure 10:
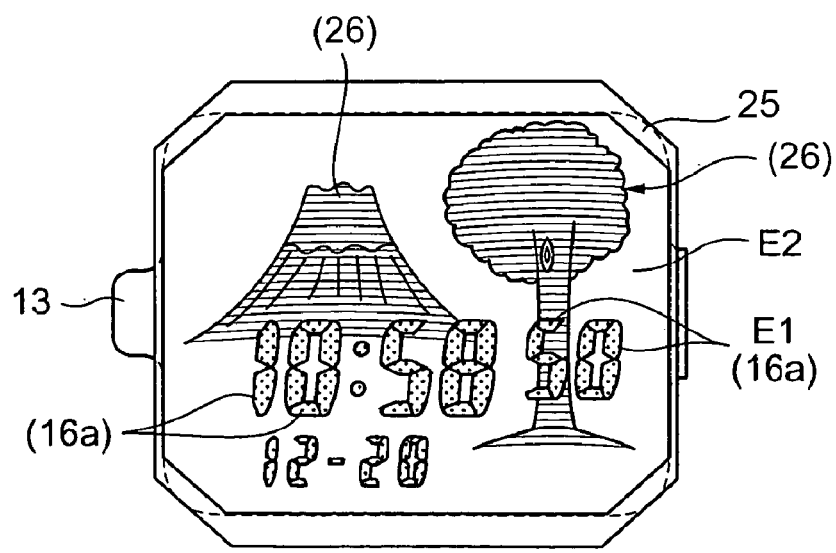
FIG. 10 is an enlarged front view showing a display state of a liquid crystal display element in FIG. 7.
Figure 7:
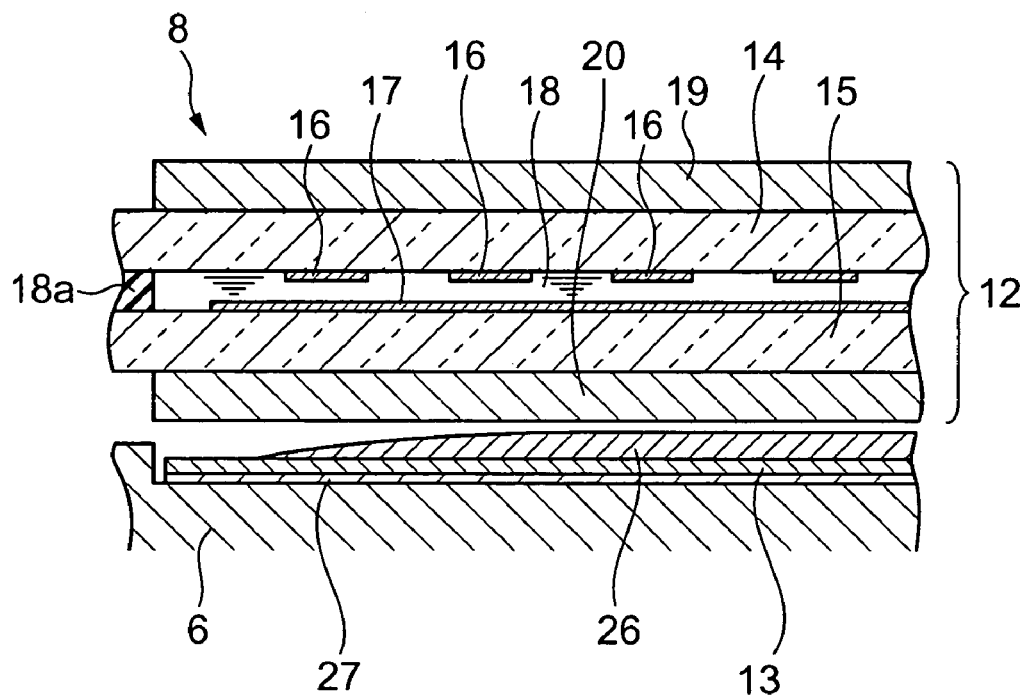
Figure 8:
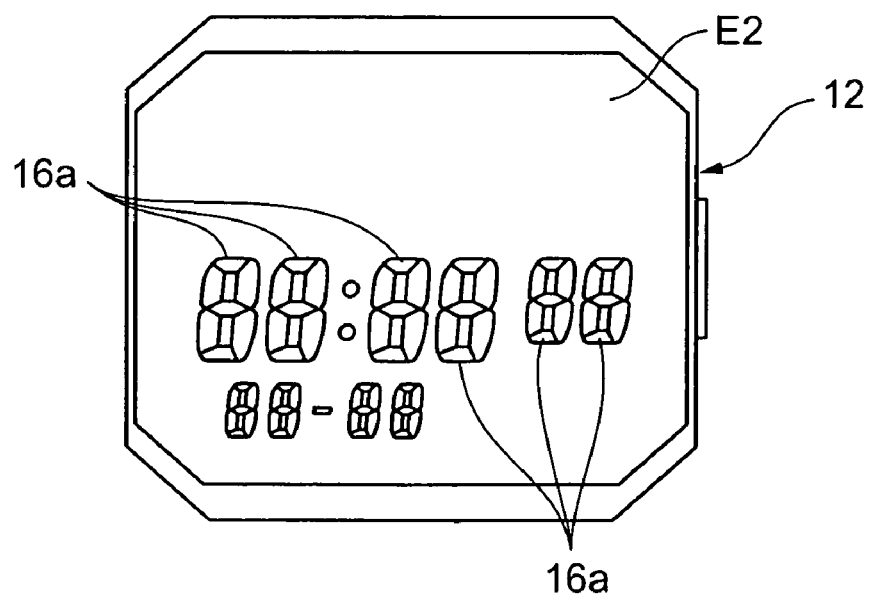
Figure 9A:
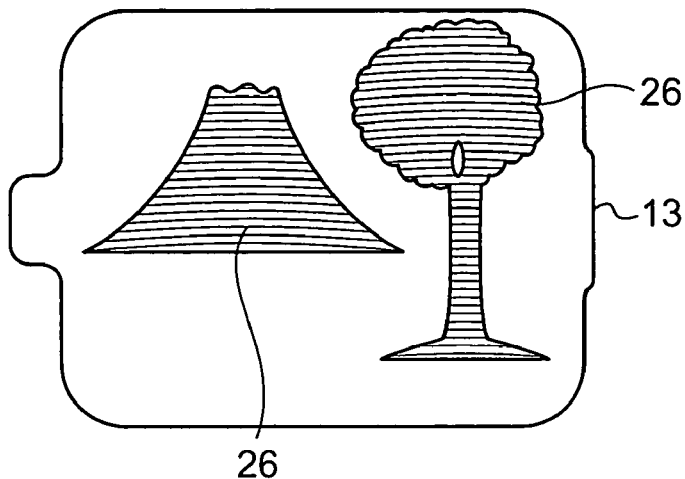
Figure 9B:
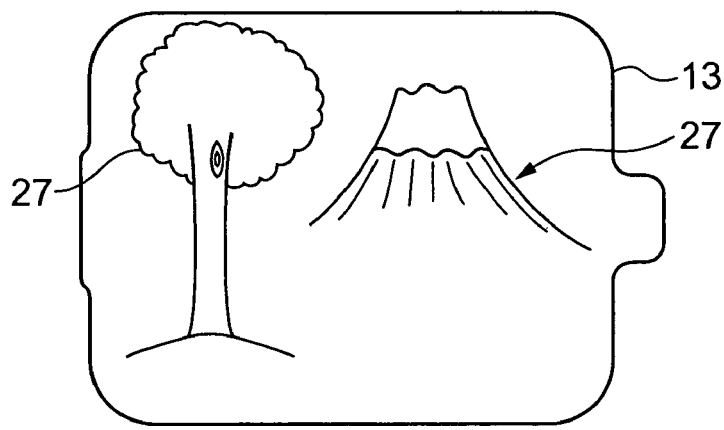
Figure 10:
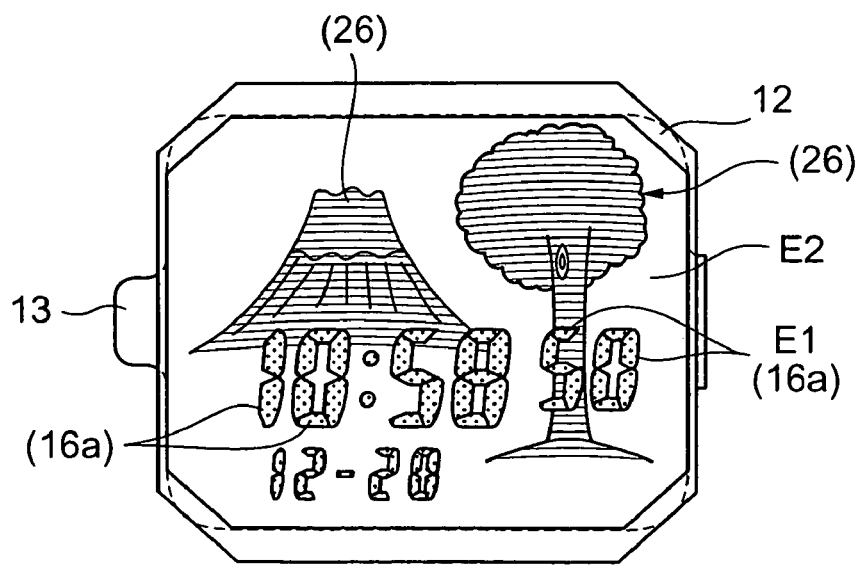

According to this kind of electronic watch, as in the case of the first embodiment, external light is taken into the watchcase 1 in a light place, and the liquid crystal display element 25 of the display device 8 is irradiated with this light. Thus, when the liquid crystal display element 25 is driven to display information such as time, the displayed information can be seen from outside the watchcase 1 through the watch glass 2. In other words, when the liquid crystal display element 25 is driven and a voltage is selectively applied between the transparent electrodes 16 and 17 of the pair of substrates 14 and 15, the ON regions E1 where the transparent electrodes 16 and 17 between which the voltage is applied overlap each other become a light-blocking state, and information such as time is displayed in black by the ON regions E1 as shown in FIG. 10.

At this time, regarding the external light with which the liquid crystal display element 25 has been irradiated, only the external light with which the ON regions E1 where the transparent electrodes 16 and 17 between which the voltage is applied overlap each other is irradiated is blocked at the ON regions E1. At points corresponding to the OFF regions E2, which are regions other than the ON regions E1, the external light is transmitted through the liquid crystal display element 25, lens portions 26, and lens panel 13 in this order. The decorative layers 27 are then irradiated with the transmitted light. This light, with which the decorative layers 27 have been irradiated, is reflected from the decorative layers 27, and the reflected-light is diffused at the projected lens portions 26. Then, the diffused light is transmitted through the liquid crystal display element 25 to radiate thereabove.

Thus, the picture, pattern, figure, etc., of the decorative layers 27 are displayed in color at the background portions, i.e., the OFF regions E2. Moreover, the picture, pattern, figure, etc., are displayed three-dimensionally in a gently curved convex shape through the projected lens portions 26. In this way, the picture, etc., can be displayed three-dimensionally in a gently curved convex shape as well as in color in the background, while the information on the liquid crystal display element 25 is displayed in black. Accordingly, decorative effects of colors can be added, and thus a variety of decorative effects can be obtained.

Figure 11:
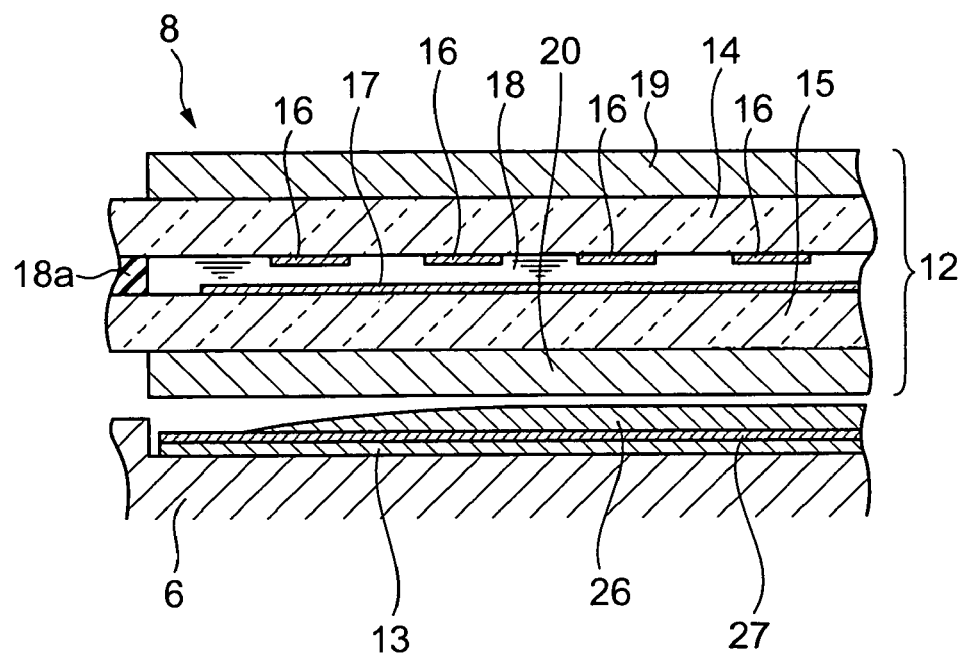
FIG. 11 is an enlarged sectional view of a main part showing a modification of the second embodiment in which a decorative layer is provided on the top surface of lens panel in FIG. 7, and lens portions are provided on this decorative layer.

In the second embodiment, the projected lens portions 26 and the decorative layers 27 are provided on the top and bottom surfaces of the lens panel 13, respectively. However, the structure thereof is not limited thereto. For example, as shown in FIG. 11, the decorative layers 27 may be provided on the top surface of the lens panel 13, and the gently curved projected lens portions 26 may be provided on the top surfaces of the decorative layers 27. Also in this structure, a picture, a pattern, a figure, etc. of the decorative layers 27 can be displayed at the background portions on the liquid crystal display element 25 three-dimensionally in a gently curved convex shape through the convex portions 26, as in the case of the second embodiment.

Moreover, the lens portions 26 are not necessarily in a projected shape, and may be in a recessed, gently curved concave shape. With such a shape, the picture, etc. of the decorative layers 27 can be displayed three-dimensionally in a gently curved concave shape.

Third Embodiment

Figure 12:
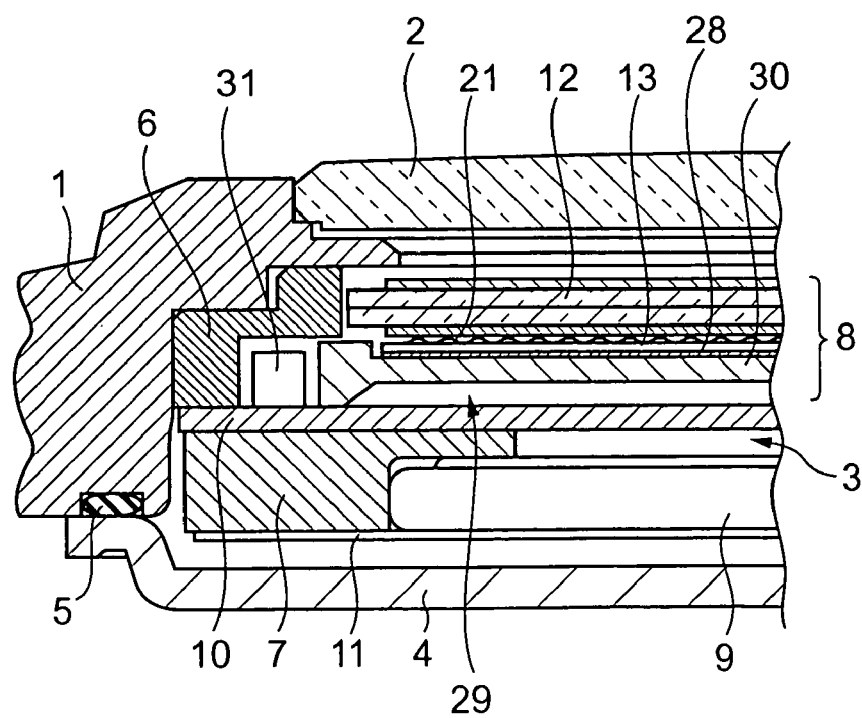
FIG. 12 is an enlarged sectional view of a main part showing a third embodiment of the invention.

Next, a third embodiment in which the invention is applied to an electronic watch will be described with reference to FIG. 12. Also in this case, the same portions as those of the first embodiment shown in FIGS. 1 to 5 are designated by the same reference numerals for explanation.

This electronic watch is structured such that a color ink layer 28 is provided on the bottom surface of the lens panel 13 as a decorative layer, and a backlight device 29 is disposed on the bottom side of the lens panel 13. The electronic watch otherwise has substantially the same structure as that of the first embodiment. Also in this case, on the top surface of the lens panel 13, the projected lens portions 21 are provided so as to correspond to the regions where the transparent electrodes 16 and 17 of the liquid crystal display element 12 overlap, i.e., to the segment electrodes 16a of the upper transparent electrode 16.

The color ink layer 28 is a transmissive layer made by providing colored particles into a transparent protection film. The color ink layer 28 is provided on the entire bottom surface of the lens panel 13 to make light passing therethrough be colored. The backlight device 29 includes a light guide plate 30 and a light-emitting element 31 such as a light-emitting diode (LED). The light guide plate 30 is disposed to correspond to the bottom surface of the lens panel 13, and the light-emitting element 31 is disposed to correspond to the side surface of the light guide plate 30. When the light-emitting element 31 emits light in this state, the light enters the light guide plate 30 from the side surface thereof, and the light is guided in the surface direction in the light guide plate 30 to be released from the top surface of the light guide plate 30. Thus, the liquid crystal display element 12 is illuminated from the bottom surface side thereof through the lens panel 13.

According to this kind of electronic watch, as in the case of the first embodiment, external light is taken into the watchcase 1 in a light place, and the liquid crystal display element 12 of the display device 8 is irradiated with the light. Thus, when the liquid crystal display element 12 is driven to display information such as time, the displayed information can be seen from outside the watchcase 1 through the watch glass 2. In other words, when the liquid crystal display element 12 is driven and a voltage is selectively applied between the transparent electrodes 16 and 17 of the pair of substrates 14 and 15, the ON regions E1 where the transparent electrodes 16 and 17 between which the voltage is applied overlap each other become a light-transmitting state, and information such as time is displayed by the ON regions E1 as shown in FIG. 5.

At this time, regarding the external light with which the liquid crystal display element 12 has been irradiated, only the external light with which the ON regions E1, which correspond to the transparent electrodes 16 and 17 between which the voltage has been applied, have been irradiated is transmitted through the liquid crystal display element 12 at points corresponding to the ON regions E1. The lens portions 21 of the lens panel 13 are then irradiated with the transmitted light. A part of the light with which the lens portions 21 have been irradiated is reflected radially off the surfaces of the projected lens portions 21, and the other part of the light is transmitted through the lens panel 13 and the color ink layer 28. The light guide plate 30 of the backlight device 29 is irradiated with the transmitted light. This light is then reflected from the light guide plate 30 to be transmitted through the color ink layer 28 and the lens panel 13, and diffused upward from the lens portions 21.

The light thus diffused and reflected from the lens portions 21 goes in reverse the above light path, and radiates above the liquid crystal display element 12. Thus, as shown in FIG. 5, the ON regions E1 are colored at the color ink layer 28 and brightly displayed as information, and the information is displayed three-dimensionally in a semicircular convex shape through the projected lens portions 21. In this way, information displayed on the liquid crystal display element 12 can be represented three-dimensionally in color. Consequently, there are a variety of colors in the display, and more highly decorative display can be obtained.

Moreover, in a dark place, when the light-emitting element of the backlight element 27 is lit, the light is colored at the decorative layer 26 and transmitted therethrough. The transmitted light is transmitted through the lens panel 13 and diffused at the projected lens portions 21 to illuminate the bottom surface of the liquid crystal display element 12. Thus, when the liquid crystal display element 12 is driven, the ON regions E1 where the transparent electrodes 16 and 17 between which a voltage has been applied overlap each other become a light-transmitting state, and information such as time is displayed by the ON regions E1 as shown in FIG. 5.

Also at this time, as in the aforementioned case, information on the liquid crystal display element 12 is displayed in color that has been put on at the color ink layer 28, and displayed three-dimensionally through the projected lens portions 21. Thus, in both light and dark places, information displayed by the ON regions E1 of the liquid crystal display element 12 can be displayed three-dimensionally in color. Accordingly, decorative effects with a variety of colors can be added, and a more variety of decorative effects can be obtained.

Figure 13:
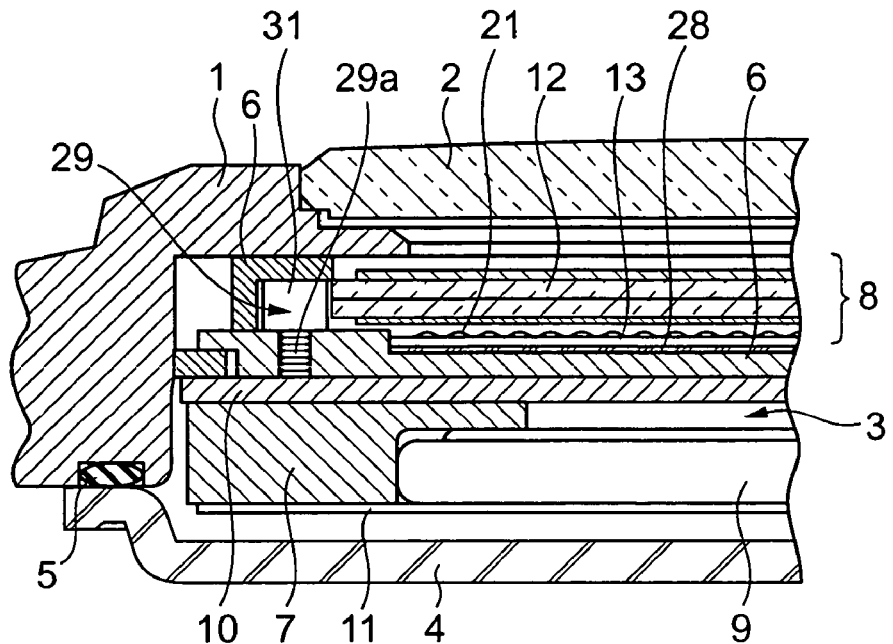
FIG. 13 is an enlarged sectional view of a main part of an electronic watch showing a modification of a backlight device in FIG. 12.

In the third embodiment, the display device 8 is configured so that the backlight device 29 performs surface emission to illuminate the liquid crystal display element 12 by guiding light from the light-emitting element 31 using the light guide plate 30 disposed on the bottom side of the lens panel 13. However, the configuration is not limited thereto. For example, as shown in FIG. 13, the configuration may be one in which the light-emitting element 31 is disposed to face the side surface of the liquid crystal display element 12, and the light-emitting element 31 is electrically connected with the circuit board 10 in this state via coil spring 29a. Light emitted from the light-emitting element 31 enters into the liquid crystal display element 12 from the side surface of the liquid crystal display element 12, thereby illuminating the liquid crystal display element 12. With this configuration, the entire display device 8 can be made thinner.

Fourth Embodiment

Figure 14:
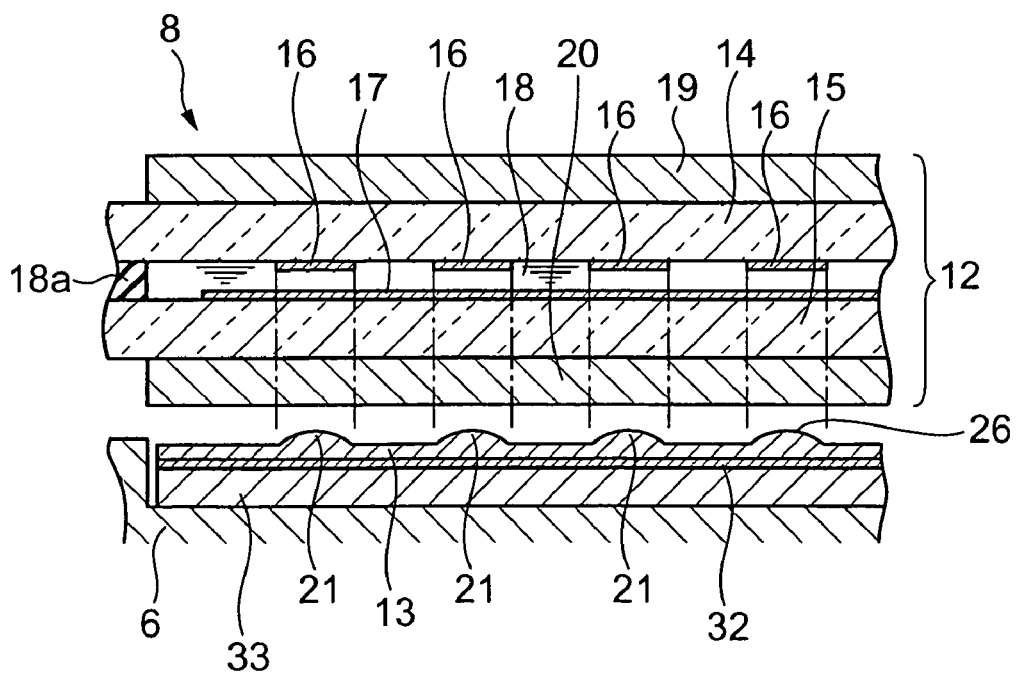
FIG. 14 is an enlarged sectional view of a main part showing a fourth embodiment of the invention.
Figure 15:
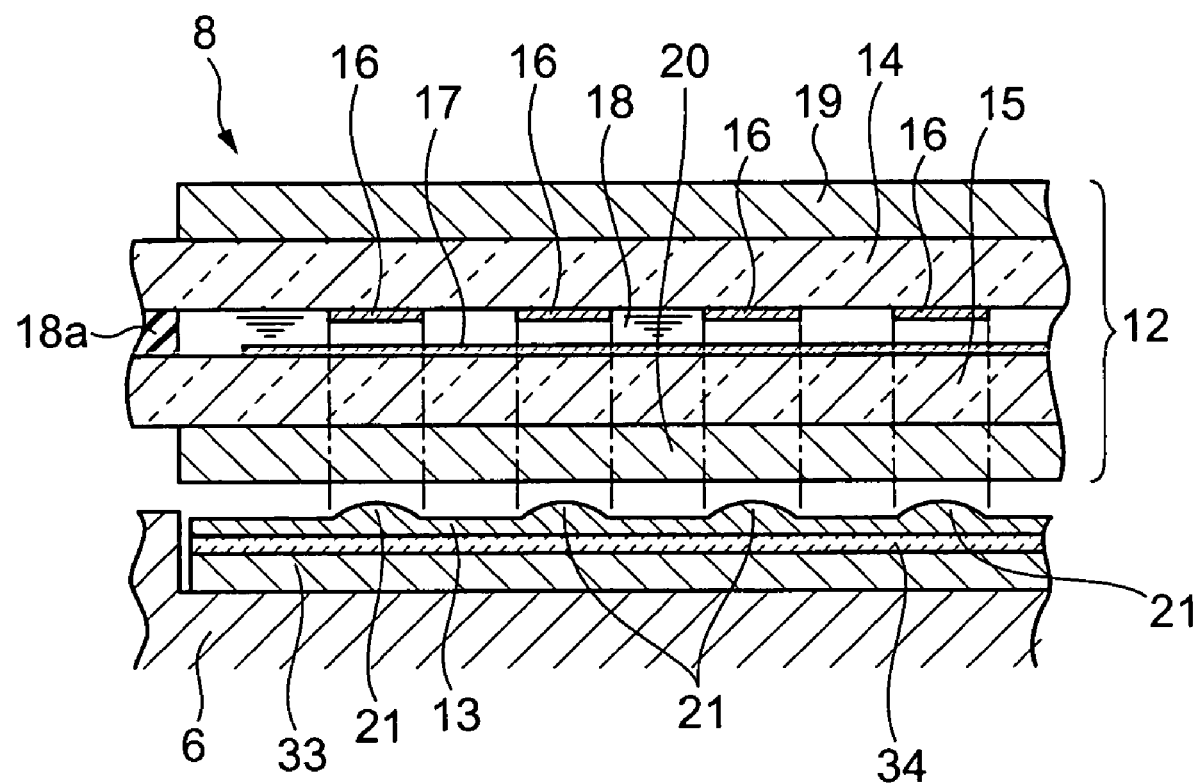
FIG. 15 is an enlarged sectional view of a main part showing a fifth embodiment of the invention.

Next, a fourth embodiment in which the invention is applied to an electronic watch will be described with reference to FIG. 14. Also in this case, the same portions as those of the first embodiment shown in FIGS. 1 to 5 are designated by the same reference numerals for explanation.

This electronic watch is structured such that a light-transmissive metal layer 32 is provided as a decorative layer on the bottom surface of the lens panel 13 having projected lens portions 21 on the top surface thereof. A backlight element 33 of a surface-emitting type is disposed on the bottom side of the lens panel 13. The electronic watch otherwise has substantially the same structure as that of the first embodiment.

The metal layer 32 is a decorative layer formed by using a light-transmissive thin metal film, and a plurality of fine through-holes hardly visible to the naked eye are formed therein. Light is transmitted through these fine through-holes while reflected off the surface of the metal layer 32 in which no through-hole is formed. Thus, the metal layer 32 is formed to have a transflective function. The backlight element 33 is formed by using a light-emitting element of a surface-emitting type such as an EL light-emitting element (electro-luminescence light-emitting element), and light emitted by surface-emission is transmitted through the metal layer 32, lens panel 13, and lens portions 21 to illuminate the liquid crystal display element 12 from the bottom surface side thereof.

According to this kind of electronic watch, as in the case of the first embodiment, external light is taken into the watchcase 1 in a light place, and the liquid crystal display element 12 of the display device 8 is irradiated with the light. Thus, when the liquid crystal display element 12 is driven to display information such as time, the displayed information can be seen from outside the watchcase 1 through the watch glass 2. In other words, when the liquid crystal display element 12 is driven and a voltage is selectively applied between the transparent electrodes 16 and 17 of the pair of substrates 14 and 15, the ON regions E1 where the transparent electrodes 16 and 17 between which the voltage has been applied overlap each other become a light-transmitting state, and information such as time is displayed by the ON regions E1 as shown in FIG. 5.

At this time, the external light with which the liquid crystal display element 12 has been irradiated is transmitted through the liquid crystal display element 12 at points corresponding to the ON regions E1. The lens portions 21 of the lens panel 13 are then irradiated with the transmitted light. A part of the light with which the lens portions 21 have been irradiated is reflected off the surfaces of the projected lens portions 21, and the other part of the light is transmitted through the lens panel 13. The metal layer 32 is irradiated with the transmitted light. This light is then reflected from the metal layer 32 to be diffused upward from the lens portions 21. The light thus diffused and reflected from the lens portions 21 goes in reverse to the above light path, and radiates above the liquid crystal display element 12. Thus, as shown in FIG. 5, the ON regions E1 are displayed three-dimensionally in a convex shape through the lens portions 21, and metallically displayed through the metal layer 32. In this way, information displayed on the liquid crystal display element 12 can be represented metallically and three-dimensionally.

Moreover, in a dark place, when the backlight element 33 is lit to perform surface-emission, the light is transmitted through the metal layer 32. The transmitted light is transmitted through the lens panel 13, and diffused at the projected lens portions 21 to illuminate the bottom surface of the liquid crystal display element 12. Thus, when the liquid crystal display element 12 is driven, the ON regions E1 become a light-transmitting state, and information such as time is displayed by the ON regions E1 as shown in FIG. 5. Also at this time, as in the aforementioned case, the information is metallically displayed in color through the metal layer 32, and displayed three-dimensionally through the projected lens portions 21. Thus, in both light and dark places, the information displayed by the ON regions E1 of the liquid crystal display element 12 can be represented metallically and three-dimensionally. Accordingly, high-class decorative effects can be added, and a more variety of decorative effects can be obtained.

Fifth Embodiment

Next, a fifth embodiment in which the invention is applied to an electronic watch will be described with reference to FIG. 15 and FIGS. 16A to 16C. In this case, the same portions as those of the fourth embodiment shown in FIG. 14 are designated by the same reference numerals for explanation.

This electronic watch includes the upper and lower polarizers 19 and 20 of the liquid crystal display element 12 which are disposed such that absorption axes (or transmission axes) 19a and 20a thereof are substantially parallel to each other. A polarizing film 34 is disposed on the bottom surface of the lens panel 13 having the projected lens portions 21. The electronic watch otherwise has substantially the same structure as that of the fourth embodiment.

Figure 16A:
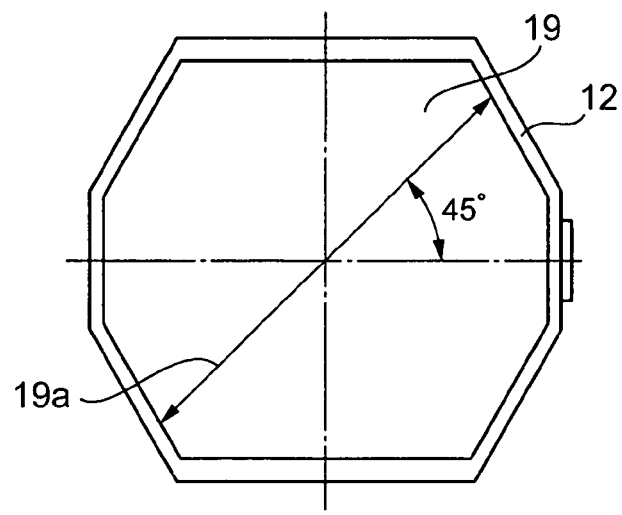
Figure 16B:
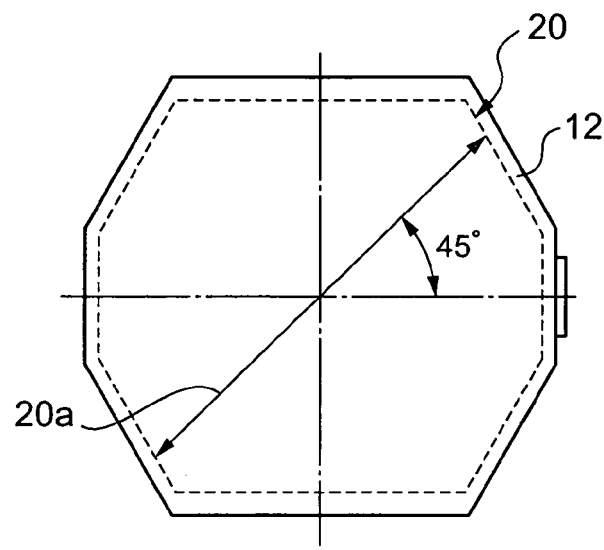

As shown in FIG. 16A, the upper polarizer 19 of the liquid crystal display element 12 is disposed such that the absorption axis 19a is inclined at substantially 45 degrees from the lower-left to the upper-right when viewed from the front. Similarly, as shown in FIG. 16B, the lower polarizer 20 is disposed such that the absorption axis 20a is inclined at substantially 45 degrees from the lower-left to the upper-right when viewed from the front. Thus, the upper and lower polarizers 19 and 20 are disposed such that the absorption axes 19a and 20a are parallel to each other.

Figure 16C:
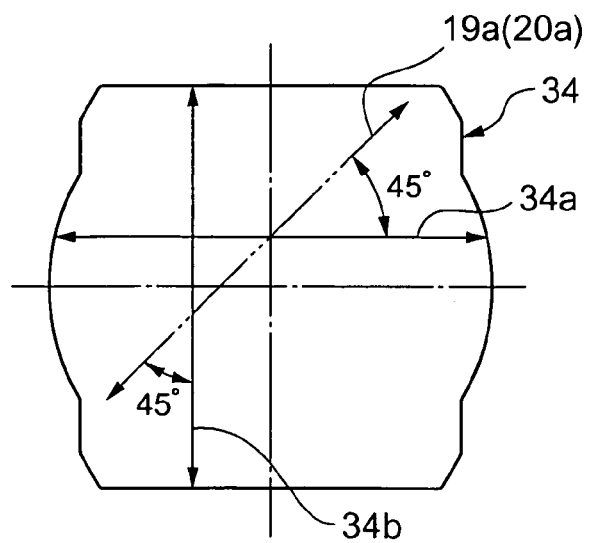

The polarizing film 34 is a multi-layered film. As shown in FIG. 16C, absorption axes 34a and 34b thereof are disposed so as to be inclined at substantially 45 degrees relative to the absorption axes 19a and 20a of the upper and lower polarizers 19 and 20 when viewed from the front. That is, when viewed from the front, the polarizing film 34 is disposed such that the absorption axis 34a is inclined clockwise at substantially 45 degrees relative to the absorption axes 19a and 20a, and the absorption axis 34b is inclined counterclockwise at substantially 45 degrees relative to the absorption axes 19a and 20a.

According to this kind of electronic watch, as in the case of the fourth embodiment, external light is taken into the watchcase 1 in a light place, and the liquid crystal display element 12 is irradiated with the light. Thus, when the liquid crystal display element 12 is driven and a voltage is selectively applied between the transparent electrodes 16 and 17 of the pair of substrates 14 and 15, the ON regions E1 corresponding to the transparent electrodes 16 and 17 between which the voltage has been applied become a light-transmitting state, and information such as time is displayed by the ON regions E1 as shown in FIG. 5. At this time, regarding the external light with which the liquid crystal display element 12 has been irradiated, only the external light with which the ON regions E1 have been irradiated is transmitted through the liquid crystal display element 12 at points corresponding to the ON regions E1. The lens portions 21 of the lens panel 13 are then irradiated with the transmitted light. A part of the light with which the lens portions 21 have been irradiated is reflected off the surfaces of the projected lens portions 21, and the other part of the light is transmitted through the lens portions 21 and the lens panel 13. The polarizing film 34 is then irradiated with this light.

At this time, since the absorption axes 34a and 34b of the polarizing film 34 intersect the absorption axes 19a and 20a of the upper and lower polarizers 19 and 20 at an angle of substantially 45 degrees, a part of the light with which the polarizing film 34 has been irradiated is absorbed by the polarizing film 34. Meanwhile, the other part of the light is reflected from the polarizing film 34, and the reflected light is diffused upward from the lens portions 21 as metallic light. In this way, the ON regions E1 are displayed three-dimensionally in a convex shape through the lens portions 21, and represented metallically due to the reflection from the polarizing film 34. Thus, information displayed on the liquid crystal display element 12 can be represented metallically and three-dimensionally. Accordingly, as in the case of the fourth embodiment, highly decorative display can be obtained.

Moreover, in a dark place, when the backlight element 33 is caused to perform surface-emission, the light is transmitted through the polarizing film 34 along the absorption axes 34a and 34b. The transmitted light is transmitted through the lens panel 13 as metallic light, and diffused at the lens portions 21 to illuminate the bottom surface of the liquid crystal display element 12. Thus, when the liquid crystal display element 12 is driven and the ON regions E1 become a light-transmitting state, a part of the light with which the ON regions E1 have been irradiated is reflected. The other part of the light is transmitted, whereby information such as time is displayed as shown in FIG. 5. At this time, as in the aforementioned case, information is displayed metallically due to the metallic light transmitted through the polarizing film 34. Moreover, the information is displayed three-dimensionally in a convex shape through the lens portions 21. Thus, in both light and dark places, information displayed by the ON regions E1 of the liquid crystal display element 12 is displayed metallically and three-dimensionally. Accordingly, high-class decorative effects can be added, and a variety of decorative effects can be obtained.

In the fifth embodiment, the display device 8 is structured to be of a transmissive type in which the polarizing film 34 is disposed such that the absorption axes 34a and 34b thereof are inclined at substantially 45 degrees relative to the absorption axes 19a and 20a of the polarizers 19 and 20 of the liquid crystal display element 12. However, the display device 8 is not limited thereto. For example, the display device 8 may be structured to be of a reflective type in which the polarizing film 34 is disposed such that the absorption axes 34a and 34b thereof are inclined at substantially 90 degrees relative to the absorption axes 19a and 20a of the polarizers 19 and 20 of the liquid crystal display element 12. Substantially the same effects as those of the fifth embodiment can be obtained also with such a structure.

Sixth Embodiment

Figure 17:
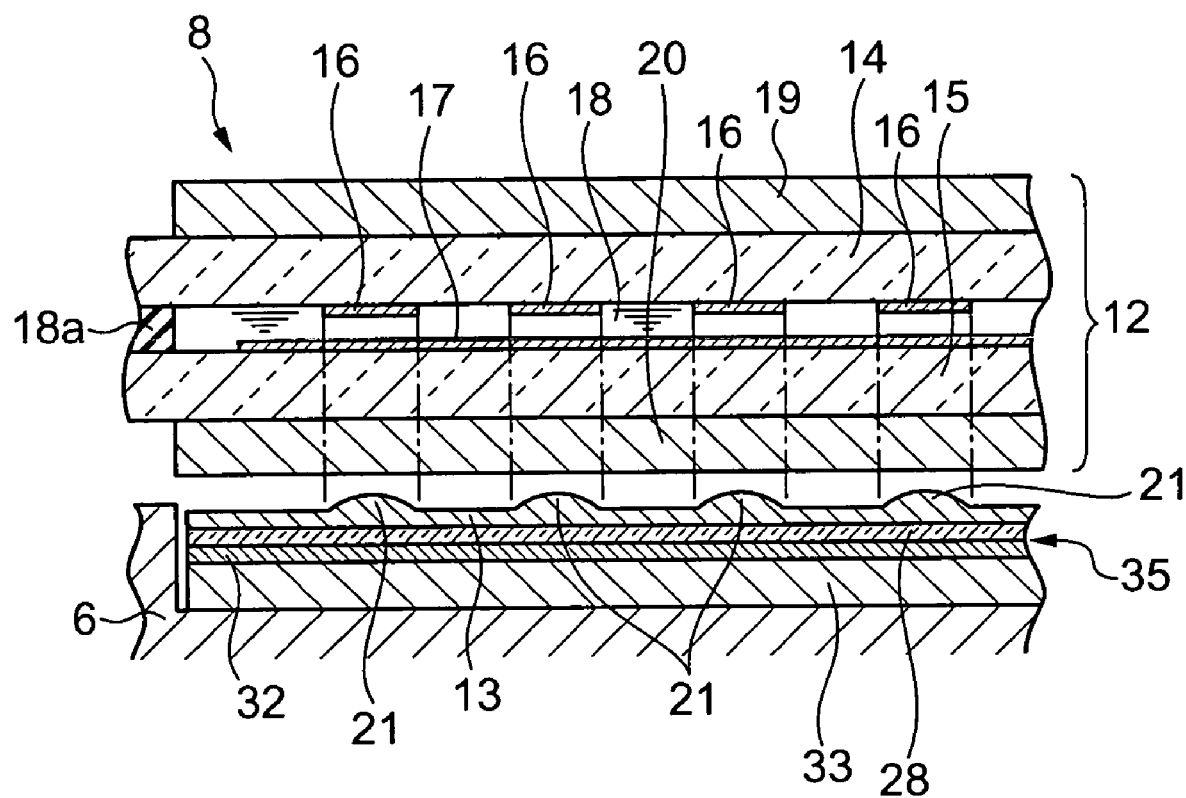
FIG. 17 is an enlarged sectional view of a main part showing a sixth embodiment of the invention.

Next, a sixth embodiment in which the invention is applied to an electronic watch will be described with reference to FIG. 17. Also in this case, the same portions as those of the fourth embodiment shown in FIG. 14 are designated by the same reference numerals for explanation.

This electronic watch is structured such that a two-layered decorative layer 35 is provided on the bottom surface of the lens panel 13 having the projected lens portions 21 on the top surface thereof. The backlight element 33 is provided on the bottom side of the decorative layer 35. The electronic watch otherwise has substantially the same structure as that of the fourth embodiment.

The decorative layer 35 has a two-layer structure in which the color ink layer 28 and the metal layer 32 are stacked on each other. The color ink layer 28 has a light-transmissive property as in the case of the third embodiment, and is provided on the entire bottom surface of the lens panel 13. The metal layer 32 is a decorative layer formed by using a light-transmissive thin metal film as in the case of the fourth embodiment, and a plurality of fine through-holes hardly visible to the naked eye are formed therein. Light is transmitted through these fine through-holes while reflected off the surface of the metal layer 32 in which no through-hole is formed. Thus, the metal layer 32 is formed to have a transflective function. As in the case of the fourth embodiment, the backlight element 33 is formed by using a light-emitting element of a surface-emitting type such as an EL light-emitting element (electro-luminescence light-emitting element), and the liquid crystal display element 12 is illuminated by light emitted by surface-emission.

According to this kind of electronic watch, as in the case of the fourth embodiment, the ON regions E1 of the liquid crystal display element 12 become a light-transmitting state in both light and dark places. When information such as time is displayed by the ON regions E1, the information is represented three-dimensionally through the lens portions 21 and in color added through the decorative layer 35. In a light place, external light is transmitted through the ON regions E1, lens portions 21 and lens panel 13 in this order, and the decorative layer 35 is irradiated with the transmitted light. The light is then transmitted through the color ink layer 28 of the decorative layer 35, and reflected by the metal layer 32. Thus, the information is displayed in color through the color ink layer 28 of the decorative layer 35 with metallic decoration added through the metal layer 32.

Moreover, in a dark place, when the backlight element 33 is lit to perform surface-emission, the light is transmitted through the metal layer 32 of the decorative layer 35. The light is colored at and transmitted through the color ink layer 28, and the transmitted light is transmitted through the lens panel 13 to be diffused at the lens portions 21. Thus, as in the case of the fourth embodiment, the information is displayed in color through the color ink layer 28 of the decorative layer 35 with metallic decoration added through the metal layer 32. In this way, in both light and dark places, the information displayed on the liquid crystal display element 12 can be represented metallically in color, and thus a more variety of decorative effects can be obtained than in the case of the fourth embodiment.

Figure 18:
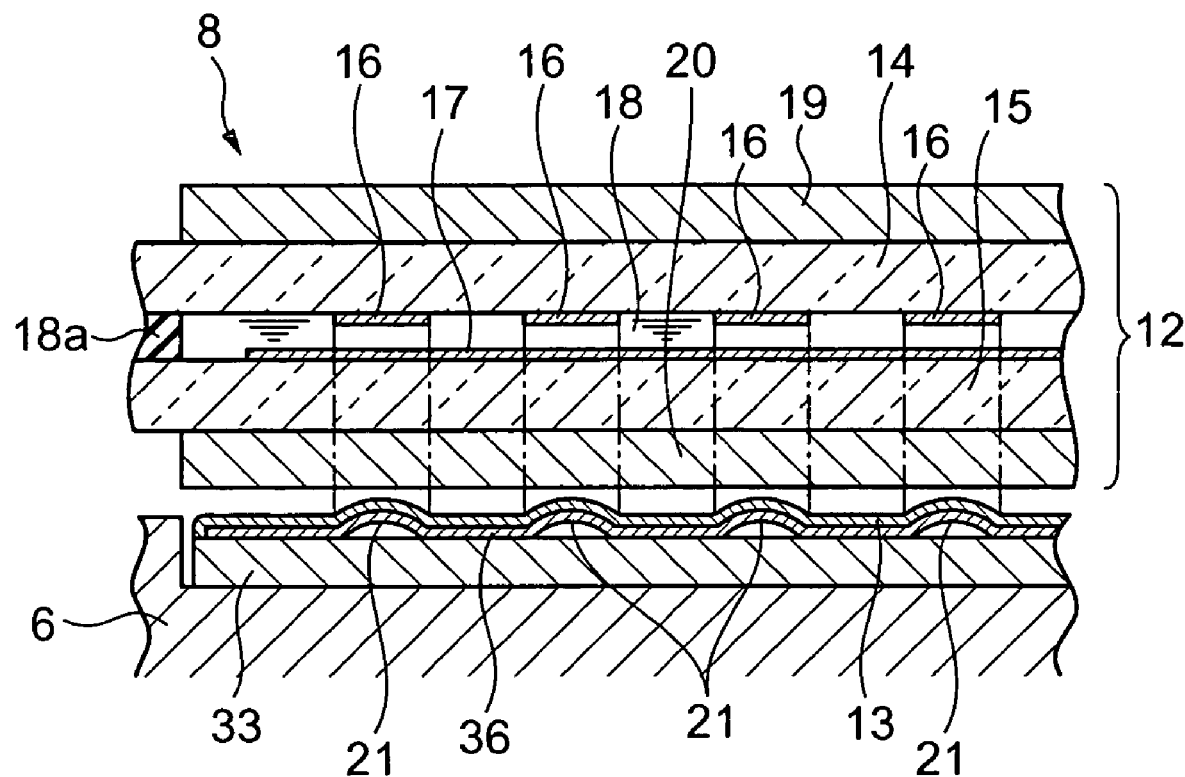
FIG. 18 is an enlarged sectional view of a display device showing a modification of the sixth embodiment in which lens portions are formed by embossing a lens panel in FIG. 17.

In the first to sixth embodiments, the lens portions 21 are formed integrally with the lens panel 13 on the top surface thereof. However, the lens portions 21 are not limited thereto. For example, as shown in FIG. 18, the projected lens portions 21 may be formed in a waveform and integrally with the lens panel 13 by embossing the lens panel 13. If a decorative layer 36 is provided on the bottom surface of the lens panel 13 beforehand, which is to be formed in a waveform, the decorative layer 36 can be provided along the projections and recesses of the lens panel 13. The decorative layer 36 may include at least one of the semi-transmissive color ink layer 28 and the semi-transmissive metal layer 32.

Figure 19:
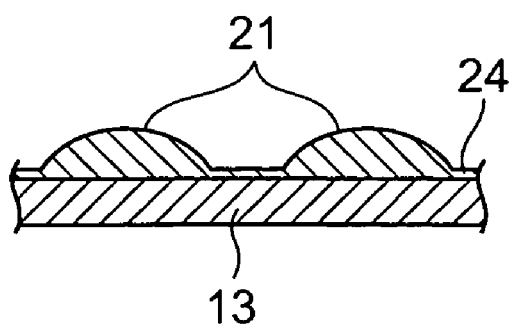
FIG. 19 is an enlarged sectional view of a main part showing a modification of the sixth embodiment in which lens portions in FIG. 17 are formed on a sheet and the sheet is provided on the lens panel.
Figure 20:
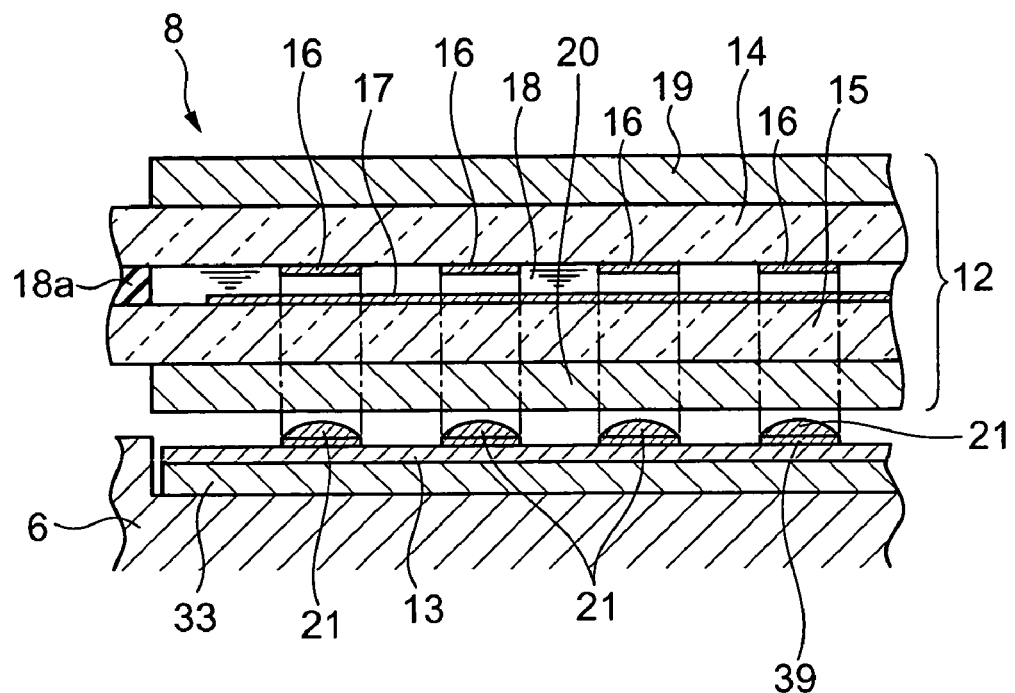
FIG. 20 is an enlarged sectional view of a display device showing a modification of the sixth embodiment in which lens portions are adhered with an adhesive on the lens panel in FIG. 17.
Figure 21:
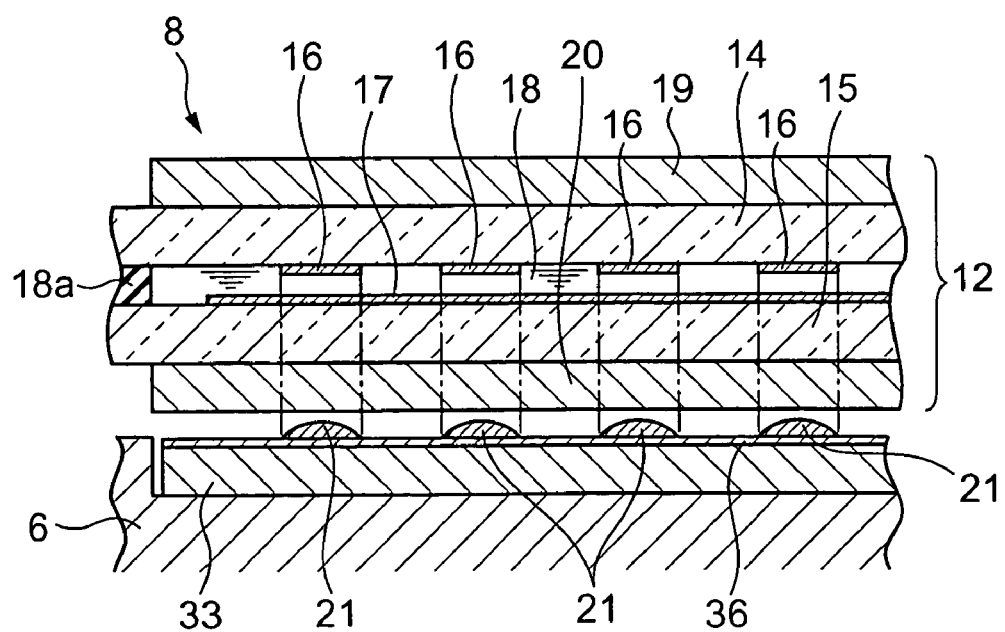
FIG. 21 is an enlarged sectional view of a display device showing a modification of the sixth embodiment in which a decorative layer is provided on the top surface of a backlight element in FIG. 17, and lens portions are formed on the decorative layer.
Figure 22A:
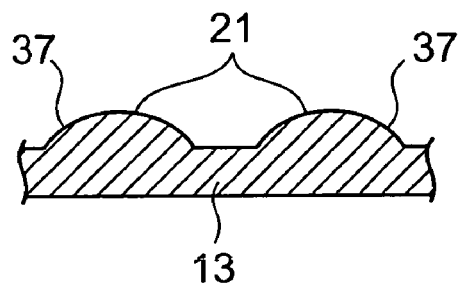
Figure 22B:
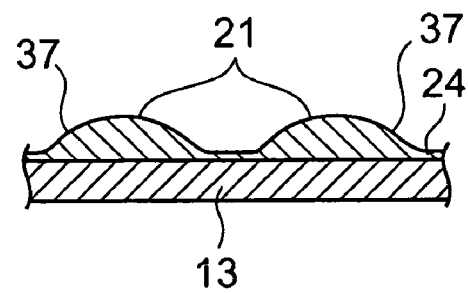

Alternatively, as shown in FIG. 19, the projected lens portions 21 may be formed integrally with the light-transmissive sheet 24, and the sheet 24 may be provided on the top surface of the lens panel 13. Moreover, as shown in FIG. 20, the projected lens portions 21 may be formed separately from the lens panel 13, and the respective lens portions 21 may be adhered on the top surface of the lens panel 13 with a transparent adhesive 39. Furthermore, as shown in FIG. 21, the decorative layer 36 may be provided on the top surface of the backlight element 33, and the lens portions 21 made of ultraviolet curable resin may be provided directly on the top surface of the decorative layer 36. Moreover, as shown in FIGS. 22A and 22B, the surfaces of the projected lens portions 21 may be formed to be finely projected and recessed surfaces 37.

Figure 23A:
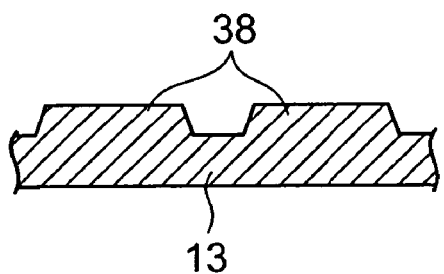
Figure 23B:
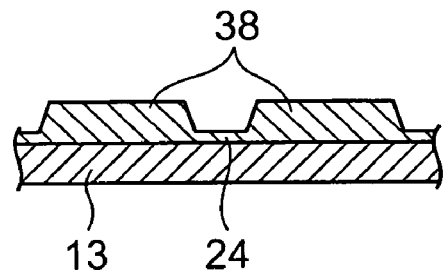
Figure 24A:
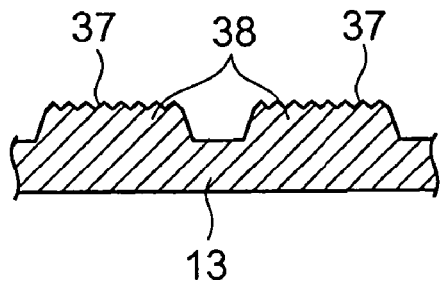
Figure 24B:
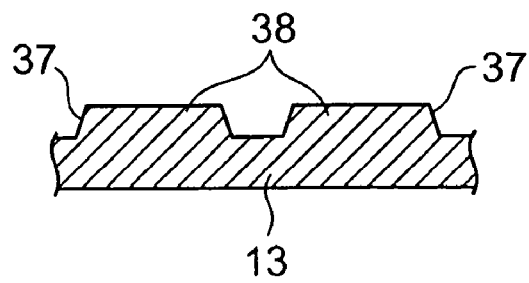

In the first to sixth embodiments and the modifications thereof, the respective projected lens portions 21 are formed in a semicircular shape. However, the shape of the lens portions 21 is not limited thereto. As shown in FIGS. 23A and 23B, respective projected lens portions 38 may be formed in a trapezoidal shape. Also in this case, as shown in FIG. 23A, the trapezoidal lens portions 38 may be formed integrally with the lens panel 13 by injection molding. Alternatively, as shown in FIG. 23B, the trapezoidal projected portions 38 may be formed on the light-transmissive sheet 24, and the sheet 24 may be provided on the top surface of the lens panel 13. Moreover, as shown in FIGS. 24A and 24B, the surfaces of the trapezoidal projected portions 38 may be formed to be the finely projected and recessed surfaces 37. As shown in FIG. 24A, only the top surfaces of the trapezoidal lens portions 38 may be formed to be the finely projected and recessed surfaces 37, or, as shown in FIG. 24B, only the side surfaces of the trapezoidal lens portions 38 may be formed to be the finely projected and recessed surfaces 37.

Seventh Embodiment

Figure 25:
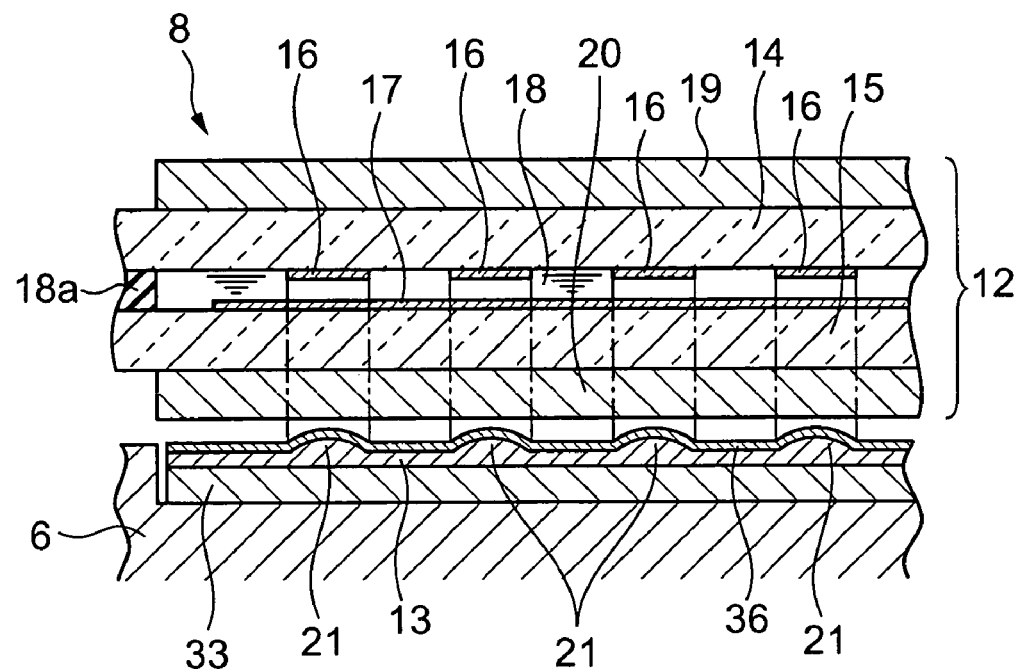
FIG. 25 is an enlarged sectional view of a main part showing a seventh embodiment of a display device for an electronic watch to which the invention is applied.

Next, a seventh embodiment in which the invention is applied to an electronic watch will be described with reference to FIG. 25. Also in this case, the same portions as those of the fourth embodiment shown in FIG. 14 are designated by the same reference numerals for explanation.

This electronic watch is structured such that the light-transmissive decorative layer 36 is provided on the top surface of the lens panel 13 having the projected lens portions 21 on the top surface thereof, whereby the lens portions 21 formed on the top surface of the lens panel 13 are covered with the decorative layer 36. The electronic watch otherwise has substantially the same structure as that of the fourth embodiment. In this case, for color display, the decorative layer 36 is formed by using, for example, a semi-transmissive color ink layer out of a semi-transmissive color ink layer and a semi-transmissive metal layer.

According to this kind of electronic watch, as in the case of the fourth embodiment, the ON regions E1 of the liquid crystal display element 12 become a light-transmitting state in both light and dark places. When information such as time is displayed by the ON regions E1, the information is represented three-dimensionally through the projected lens portions 21 formed on the lens panel 13, and in color through the color ink layer of the decorative layer 36. In this way, the information displayed on the liquid crystal display element 12 can be represented three-dimensionally in color in both light and dark places. Thus, decorative effects of colors can be added, and a variety of decorative effects can be obtained.

Figure 26:
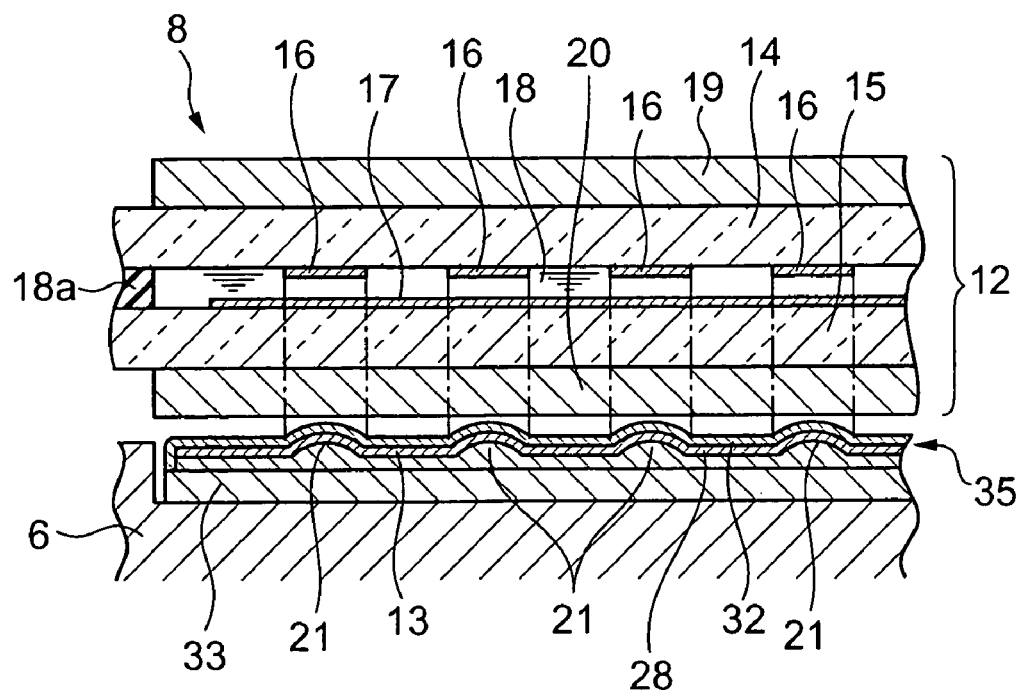
FIG. 26 is an enlarged sectional view of a display device showing a modification of the seventh embodiment in which a two-layered decorative layer is provided instead of a decorative layer in FIG. 25.

In the seventh embodiment, the decorative layer 36 is formed by using the semi-transmissive color ink layer. However, the decorative layer 36 is not limited thereto. For example, the decorative layer 36 may be formed by using the semi-transmissive metal layer 32 which is formed by using a thin metal layer having a plurality of fine through-holes hardly visible to the naked eye. The ON regions E1 can then be represented metallically through the metal layer 32. Alternatively, instead of the decorative layer 36, for example, as shown in FIG. 26, the two-layered decorative layer 35, in which the semi-transmissive color ink layer 28 and the semi-transmissive metal layer 32 are stacked on each other, may be used. In this way, as in the case of the sixth embodiment, the ON regions E1 can be represented metallically in color through the two-layered decorative layer 35. Accordingly, a more variety of decorative effects can be obtained.

Eighth Embodiment

Figure 27:
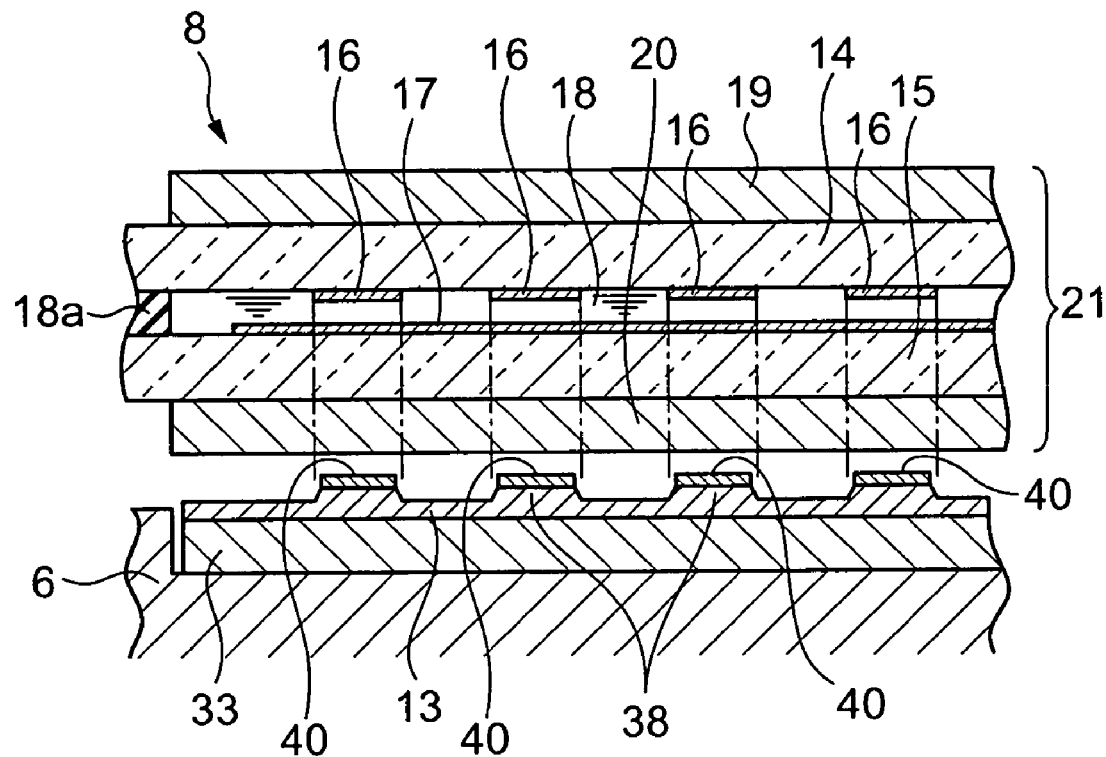
FIG. 27 is an enlarged sectional view of a main part showing an eighth embodiment of the invention.
Figure 28:
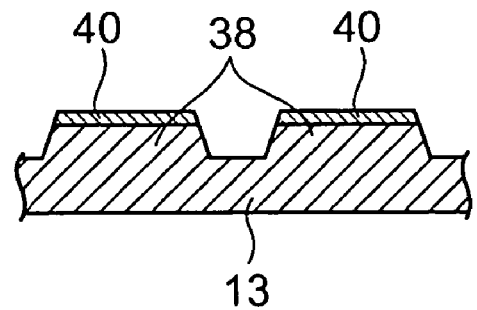
FIG. 28 is an enlarged sectional view showing lens portions in FIG. 27.

Next, an eighth embodiment in which the invention is applied to an electronic watch will be described with reference to FIGS. 27 and 28. In this case, the same portions as those of the seventh embodiment shown in FIG. 25 are designated by the same reference numerals for explanation.

This electronic watch is structured such that the lens portions 38 each having a trapezoidal vertical cross-section are provided on the top surface of the lens panel 13, and a decorative layer 40 is provided only on the top end surface of the respective lens portions 38. The electronic watch otherwise has substantially the same structure as that of the seventh embodiment. As shown in FIG. 28, the lens portions 38, each of which has a trapezoidal vertical cross-section, are formed integrally with the lens panel 13 on the top surface thereof by injection molding, and provided so as to correspond to the regions where the transparent electrodes overlap each other. Moreover, each of the decorative layers 40 is formed by using at least one of the semi-transmissive color ink layer 28 and the semi-transmissive metal layer 32.

According to this kind of electronic watch, as in the case of the seventh embodiment, the ON regions E1 of the liquid crystal display element 12 become a light-transmitting state in both light and dark places. When information such as time is displayed by the ON regions E1, the information is displayed three-dimensionally in a trapezoidal shape through the lens portions 38 of the lens panel 13, and a part of the information is displayed in color or metallically through the decorative layers 40. Thus, in both light and dark places, the information itself that is displayed on the liquid crystal display element 12 can be three-dimensionally represented in color or metallically. Hence, as in the case of the seventh embodiment, decorative effects of colors can be added, and thus a variety of decorative effects can be obtained.

Figure 29A:
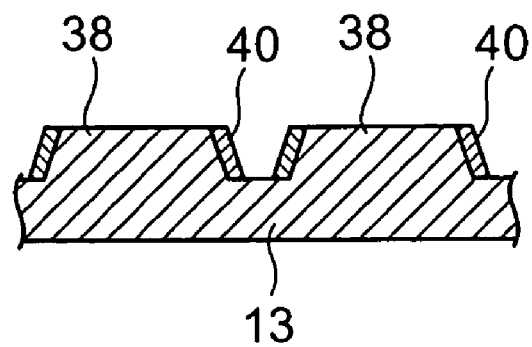
Figure 29B:
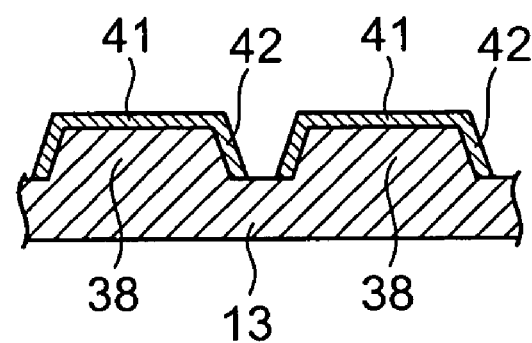
Figure 29C:
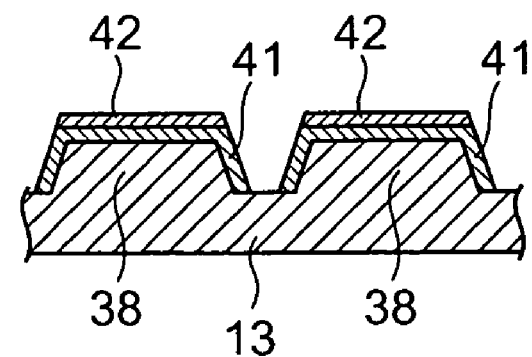

In the eighth embodiment, each of the decorative layers 40 is provided only on the top end surface of the respective lens portions 38 each having a trapezoidal vertical cross-section. However, the decorative layer is not limited thereto. For example, as shown in FIG. 29A, the decorative layers 40 may be provided only on both side surfaces of the trapezoidal lens portions 38. Alternatively, as shown in FIG. 29B, a first decorative layer 41 may be provided on the top end surface of the respective trapezoidal lens portions 38, and second decorative layers 42 may be provided on both side surfaces of the respective trapezoidal lens portions 38. Moreover, as shown in FIG. 29C, the first decorative layer 41 may be provided on the entire surface of the respective trapezoidal lens portions 38, and the second decorative layer 42 may be stacked on the first decorative layer 41 only at a point corresponding to the top end surface of the respective trapezoidal lens portions 38. Similar effects to those of the eighth embodiment can be obtained from any one of the above structures. Moreover, in particular, there are a wider variety of modes of display, and thus a more variety of decorative effects can be obtained.

Ninth Embodiment

Figure 30:
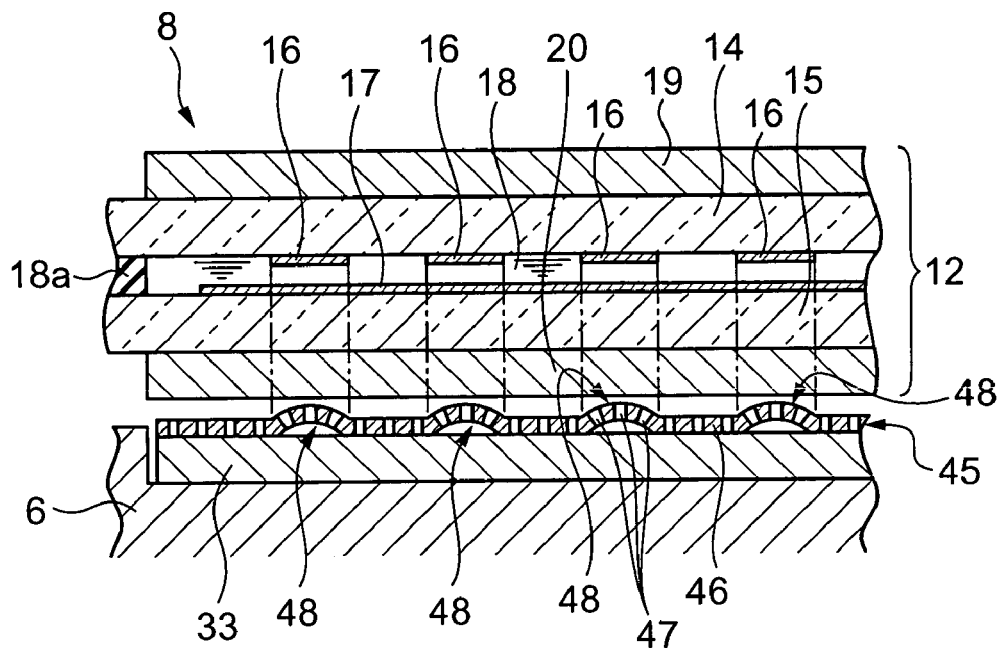
FIG. 30 is an enlarged sectional view of a main part showing a ninth embodiment of the invention.

Next, a ninth embodiment in which the invention is applied to an electronic watch will be described with reference to FIG. 30. Also in this case, the same portions as those of the fourth embodiment shown in FIG. 14 are designated by the same reference numerals for explanation.

This electronic watch is structured such that the backlight element 33 is disposed below the liquid crystal display element 12, and a decorative layer 45 in a projected and recessed shape is provided on the top surface of the backlight element 33. The electronic watch otherwise has substantially the same structure as that of the fourth embodiment. The decorative layer 45 is made by forming a plurality of through-holes 47 in a thin metal plate 46, and pressing or embossing the thin metal plate 46, thereby forming lens portions 48 each having a semicircular vertical cross-section. The lens portions 48 are provided so as to correspond to the regions where the transparent electrodes overlap each other.

The thin metal plate 46 is formed to radially reflect external light off the surfaces of the lens portions 48 when the external light is reflected off the surface of the thin metal plate 46. Moreover, each of the through-holes 47 in the thin metal plate 46 has a relatively large diameter and thus is visible to the naked eye, and thus sufficient light is transmitted therethrough. The through-holes 47 are radially arranged at the semicircular lens portions 48 so as to radially transmit light emitted from the backlight element 33. Thus, the lens portions 48 are designed to perform substantially the same lens function as that of the lens portions 21 of the fourth embodiment.

According to this kind of electronic watch, the thin metal plate 46 reflects external light off the surface thereof, and sufficient light is transmitted through the through-holes 47 in the thin metal plate 46. Thus, as in the case of the fourth embodiment, in both light and dark places, when information such as time is displayed by the ON regions E1 of the liquid crystal display element 12 that become a transmitting state, the ON regions E1 can be represented three-dimensionally through the respective lens portions 48 of the thin metal plate 46 of the decorative layer 45. In this way, in both light and dark places, information displayed on the liquid crystal display element 12 can be represented metallically and three-dimensionally. Thus, decorative effects can be added, and a variety of decorative effects can be obtained.

Tenth Embodiment

Figure 31:
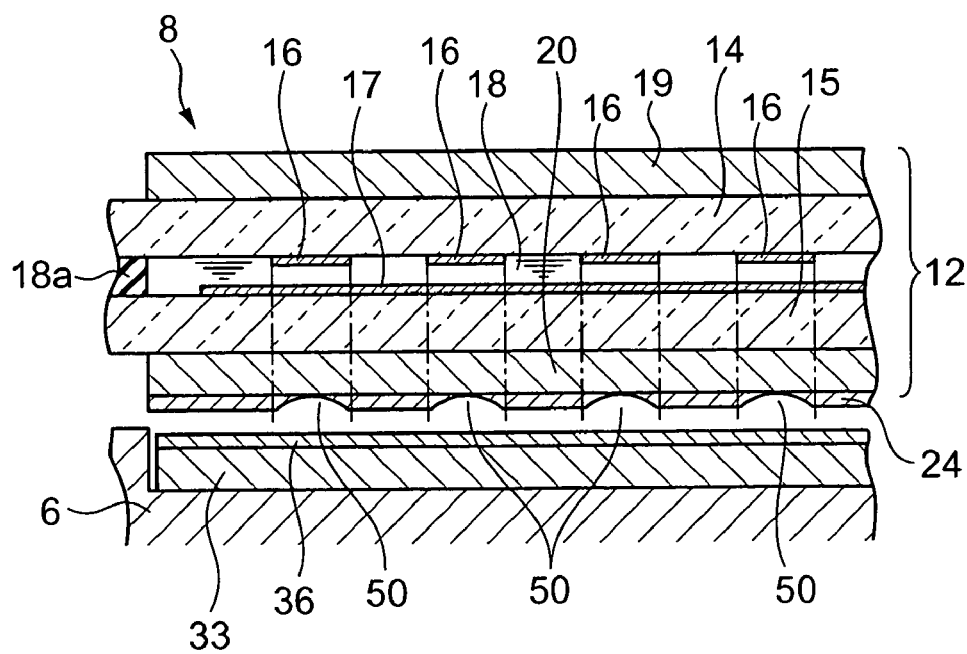
FIG. 31 is an enlarged sectional view of a main part showing a tenth embodiment of the invention.

Next, a tenth embodiment in which the invention is applied to an electronic watch will be described with reference to FIG. 31. Also in this case, the same portions as those of the fourth embodiment shown in FIG. 14 are designated by the same reference numerals for explanation.

This electronic watch is structured such that recessed lens portions 50 are provided on the bottom surface of the liquid crystal display element 12, and the decorative layer 36 is provided on the top surface of the backlight element 33. The electronic watch otherwise has substantially the same structure as that of the fourth embodiment. The respective recessed lens portions 50 have a semicircular vertical cross-section, and are formed integrally with the light-transmissive sheet 24. The sheet 24 is provided on the bottom surface of the lower polarizer 20 of the liquid crystal display element 12 so as to correspond to the regions where the transparent electrodes 16 and 17 overlap each other. The decorative layer 36 is formed by using one of the semi-transmissive color ink layer 28 and the semi-transmissive metal layer 32 as in the case of the eighth embodiment.

According to this kind of electronic watch, as in the case of the fourth embodiment, in both light and dark places, the ON regions E1 of the liquid crystal display element 12 become a light-transmitting state. When information such as time is displayed by the ON regions E1, the ON regions E1 are displayed three-dimensionally in a recessed shape through the lens portions 50 provided on the bottom surface of the liquid crystal display element 12. At this time, the ON regions E1 are displayed in color or metallically through the decorative layer 36. Thus, in both light and dark places, information displayed on the liquid crystal display element 12 can be represented three-dimensionally in a recessed shape, and in color or metallically. Accordingly, as in the case of the fourth embodiment, decorative effects of colors can be added, and thus a variety of decorative effects can be obtained.

Figure 32:
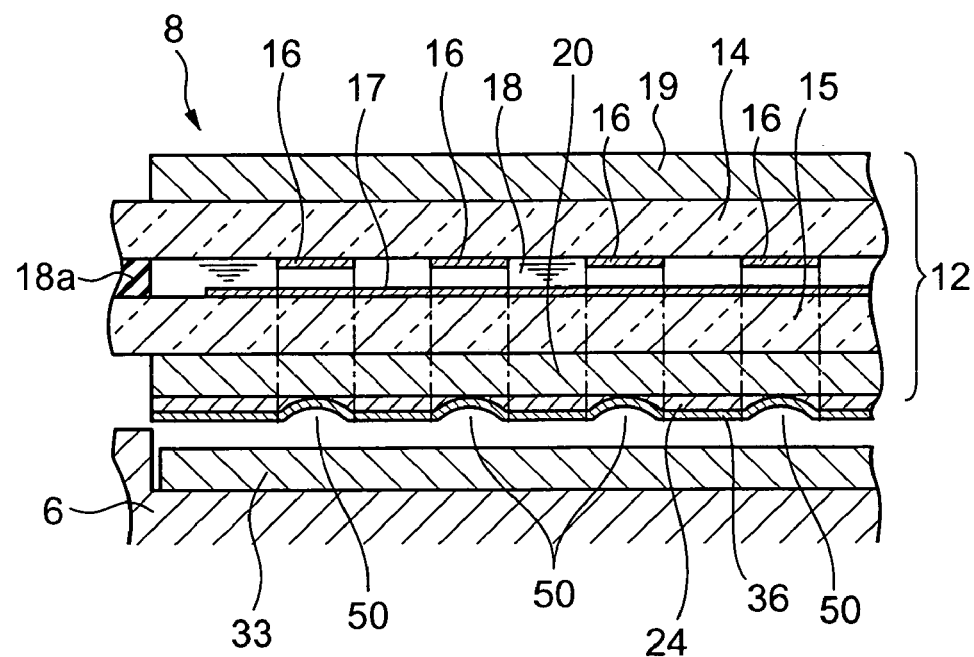
FIG. 32 is an enlarged sectional view of a display device showing a modification of the tenth embodiment in which a decorative layer is provided on the entire bottom surface of concave lens portions in FIG. 31.

In the tenth embodiment, the decorative layer 36 is provided on the top surface of the backlight element 33. However, the structure of the display device 8 is not limited thereto. For example, as shown in FIG. 32, the decorative layer 36 may be provided on the entire bottom surface of the sheet 24 having the recessed lens portions 50. In this case, the decorative layer 36 may be provided along the projections and recesses of the sheet 24 by providing the decorative layer 36 on the bottom surface of the sheet 24 in advance, and forming the recessed lens portions 50 by pressing the sheet 24 in this state. Also with such a structure, operations and effects similar to those of the tenth embodiment can be obtained.

Eleventh Embodiment

Figure 33:
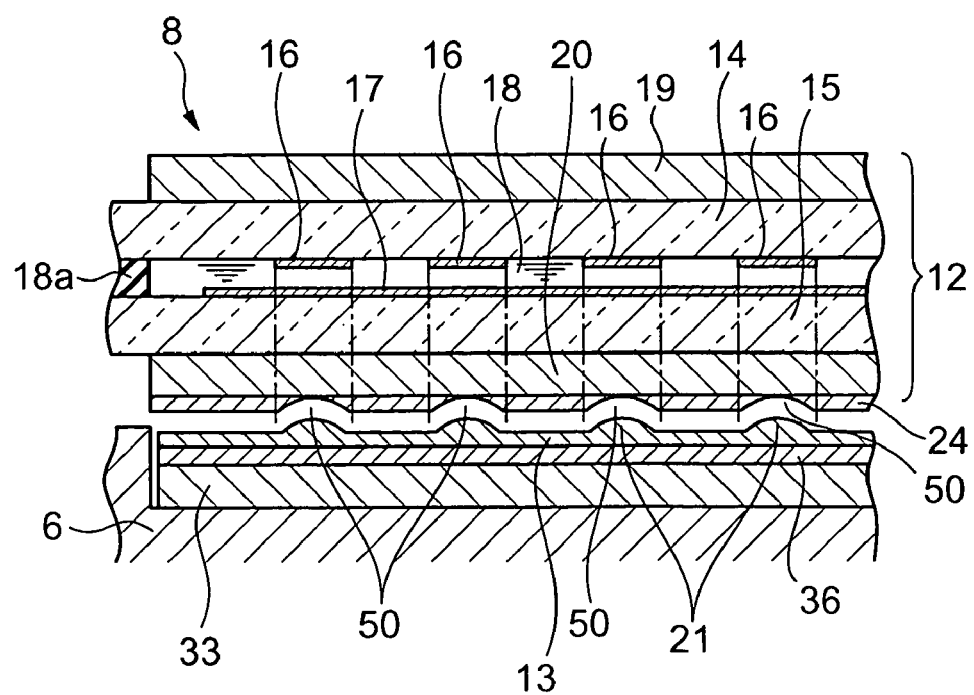
FIG. 33 is an enlarged sectional view of a main part showing an eleventh embodiment of the invention.

Next, an eleventh embodiment in which the invention is applied to an electronic watch will be described with reference to FIG. 33. Also in this case, the same portions as those of the fourth embodiment shown in FIG. 14 are designated by the same reference numerals for explanation.

This electronic watch is structured such that the decorative layer 36 is provided on the top surface of the backlight element 33, and the lens panel 13 is disposed on the decorative layer 36. Moreover, the projected lens portions 21 are provided integrally with the lens panel 13 on the top surface thereof, and the sheet 24 having the recessed lens portions 50 is provided on the bottom surface of the liquid crystal display element 12. The electronic watch otherwise has substantially the same structure as that of the fourth embodiment.

Also in this case, the decorative layer 36 is formed by using one of the semi-transmissive color ink layer 28 and the semi-transmissive metal layer 32 as in the case of the eighth embodiment. The projected lens portions 21 are formed integrally with the lens panel 13 on the top surface thereof so that each of the lens portions 21 has a semicircular vertical cross-section, and disposed so as to correspond to the regions where the transparent electrodes 16 and 17 of the liquid crystal display element 12 overlap each other. The respective recessed lens portions 50 have a semicircular vertical cross-section, and formed on the sheet 24. The sheet 24 is provided on the bottom surface of the lower polarizer 20 of the liquid crystal display element 12 so as to correspond to the regions where the transparent electrodes 16 and 17 of the liquid crystal display element 12 overlap each other, and also to correspond to the lens portions 21 of the lens panel 13.

According to this kind of electronic watch, as in the case of the fourth embodiment, in both light and dark places, the ON regions E1 of the liquid crystal display element 12 become a light-transmitting state. When information such as time is displayed by the ON regions E1, the ON regions E1 are displayed in complex three dimensions through the recessed lens portions 50 provided on the bottom surface of the liquid crystal display element 12 and the projected lens portions 21 of the lens panel 13 disposed on the backlight element 33. Also at this time, the ON regions E1 are displayed in color or metallically through the decorative layer 36. Thus, in both light and dark places, information displayed on the liquid crystal display element 12 can be represented in color or metallically, and in complex three dimensions through the recessed lens portions 50 and the projected lens portions 21. Accordingly, there are a wider variety of decorativeness and colorfulness than in the case of the tenth embodiment, and more highly decorative display can be obtained.

Figure 34:
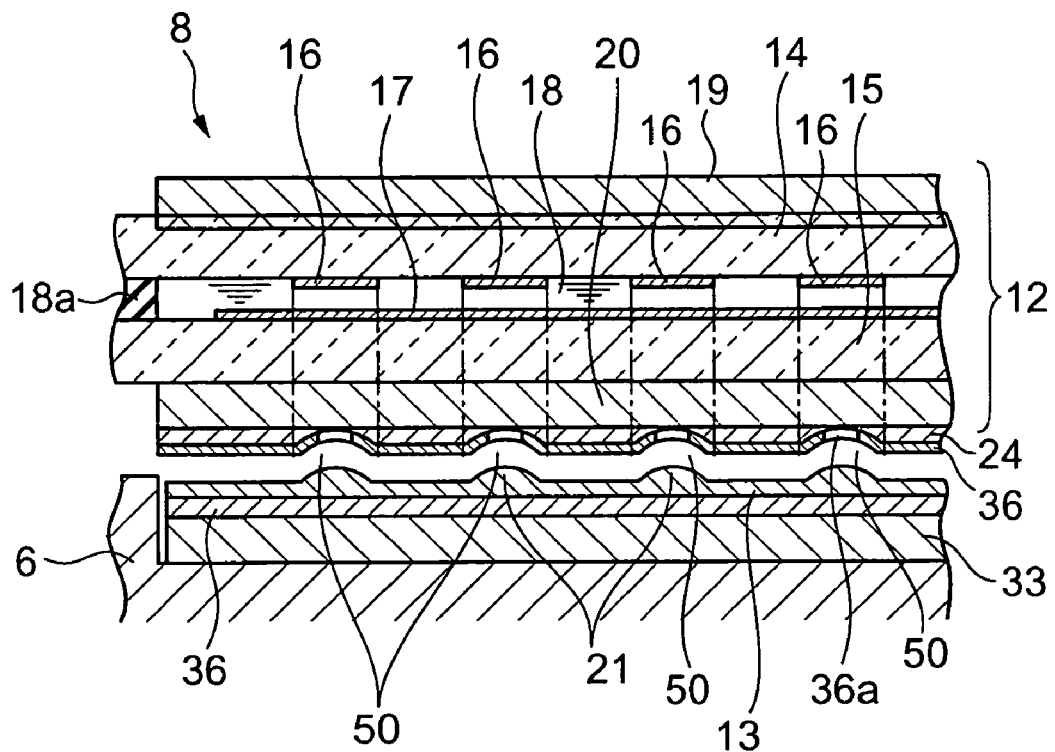
FIG. 34 is an enlarged sectional view of a display device showing a modification of the eleventh embodiment in which a decorative layer is provided on the entire bottom surface of concave lens portions in FIG. 33.

In the eleventh embodiment, the display device 8 is configured such that the decorative layer 36 is provided between the top surface of the backlight element 33 and the bottom surface of the lens panel 13. However, the configuration of the display device 8 is not limited thereto. For example, as shown in FIG. 34, the display device 8 may be configured such that the decorative layer 36 is provided also on the entire bottom surface of the sheet 24 having the recessed lens portions 50. In this case, the decorative layer 36 is formed by using a semi-transmissive color ink layer. In the decorative layer 36, opening portions 36a are formed at points positioned on the bottom portions of the recessed lens portions 50, i.e., points corresponding to the top end portions of the projected lens portions 21. With such a configuration, operations and effects similar to those of the eleventh embodiment can be obtained. Moreover, in particular, decorative effects of colors are added through both the decorative layer 36 on the bottom surface of the lens panel 13 and the decorative layer 36 on the entire bottom surface of the sheet 24 having the recessed lens portions 50. Consequently, a more variety of decorative effects can be obtained. Further, since the opening portions 36a are provided in the decorative layer 36, information can be brightly displayed on the liquid crystal display element 12.

Twelfth Embodiment

Figure 35:
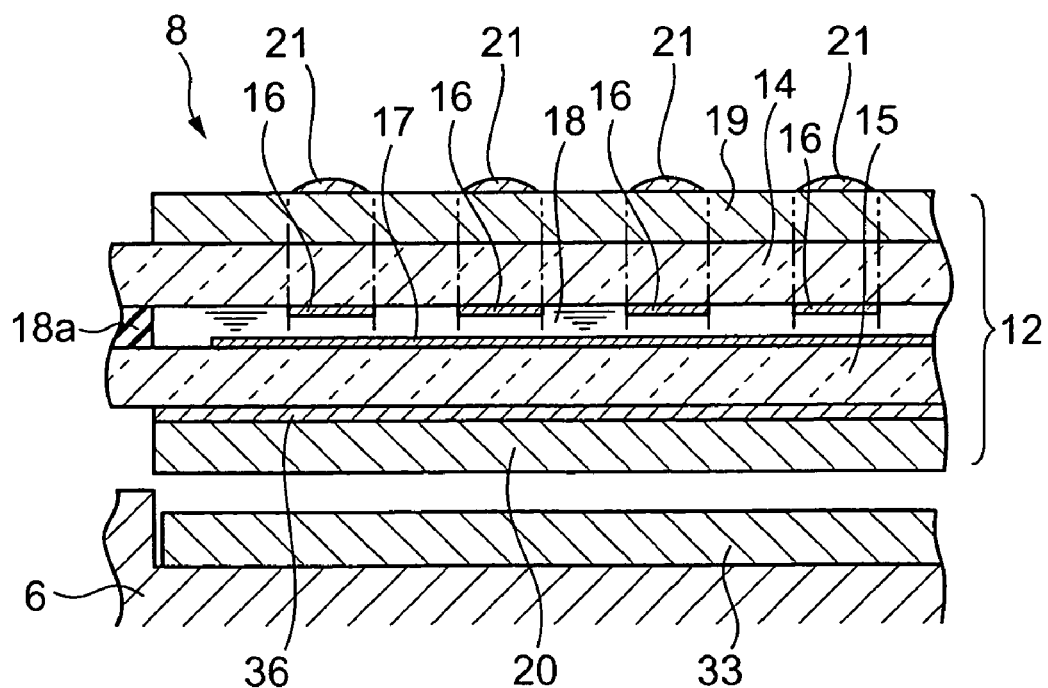
FIG. 35 is an enlarged sectional view of a main part showing a twelfth embodiment of the invention.

Next, a twelfth embodiment in which the invention is applied to an electronic watch will be described with reference to FIG. 35. Also in this case, the same portions as those of the fourth embodiment shown in FIG. 14 are designated by the same reference numerals for explanation.

This electronic watch is structured such that the projected lens portions 21 are provided on the top surface of the upper polarizer 19 of the liquid crystal display element 12, and the decorative layer 36 is provided between the lower substrate 15 and the lower polarizer 20. The electronic watch otherwise has substantially the same structure as that of the fourth embodiment. Also in this case, as in the case of the first embodiment, each of the projected lens portions 21 is made of ultraviolet curable resin and formed to have a semicircular vertical cross-section. The lens portions 21 are provided so as to correspond to the regions where the transparent electrodes 16 and 17 of the liquid crystal display element 12 overlap each other. Moreover, the decorative layer 36 is formed by using the semi-transmissive color ink layer 28, and provided at a point corresponding to a display region of the liquid crystal display element 12.

Also in this kind of electronic watch, as in the case of the fourth embodiment, in both light and dark places, the ON regions E1 of the liquid crystal display element 12 become a light-transmitting state. When information such as time is displayed by the ON regions E1, the ON regions E1 are displayed three-dimensionally through the projected lens portions 21 on the top surface of the liquid crystal display element 12. Also at this time, the ON regions E1 are displayed in color through the decorative layer 36. Thus, information displayed on the liquid crystal display element 12 can be represented three-dimensionally in color. Accordingly, as in the case of the fourth embodiment, decorative effects of colors can be added, and thus a variety of decorative effects can be obtained.

Thirteenth Embodiment

Figure 36:
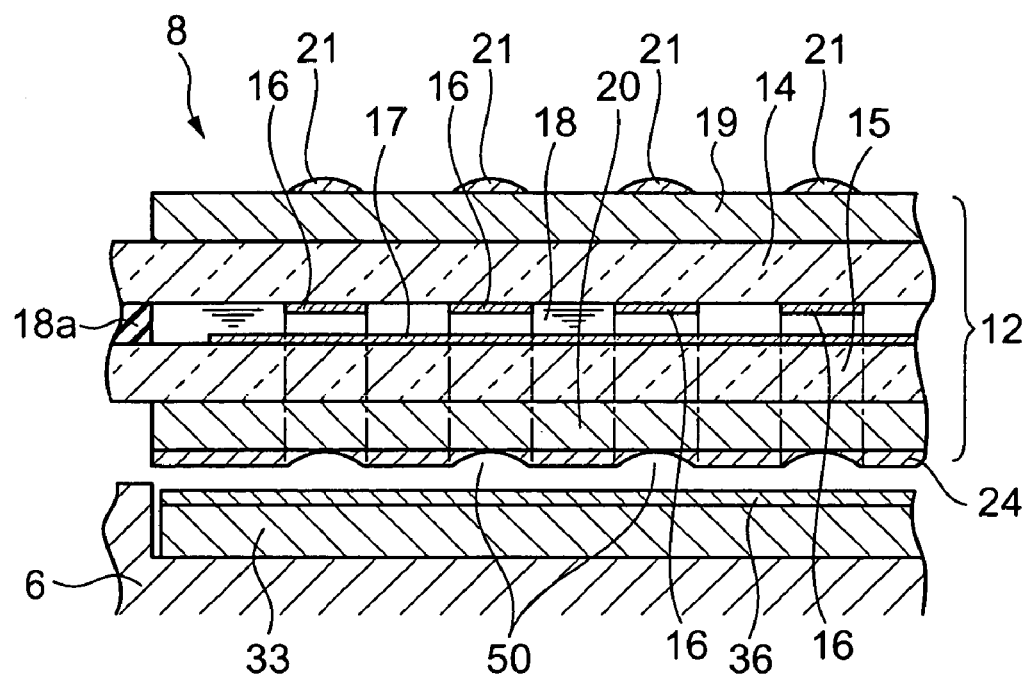
FIG. 36 is an enlarged sectional view of a main part showing a thirteenth embodiment of the invention.

Next, a thirteenth embodiment in which the invention is applied to an electronic watch will be described with reference to FIG. 36. Also in this case, the same portions as those of the fourth embodiment shown in FIG. 14 are designated by the same reference numerals for explanation.

This electronic watch is structured such that the projected lens portions 21 are provided on the top surface of the upper polarizer 19 of the liquid crystal display element 12, the recessed lens portions 50 are provided on the bottom surface of the lower polarizer 20, and the decorative layer 36 is provided on the top surface of the backlight element 33. The electronic watch otherwise has substantially the same structure as that of the fourth embodiment.

Also in this case, as in the case of the twelfth embodiment, each of the projected lens portions 21 is made of ultraviolet curable resin and formed to have a semicircular vertical cross-section. The lens portions 21 are provided so as to correspond to the regions where the transparent electrodes 16 and 17 of the liquid crystal display element 12 overlap each other. Moreover, the recessed lens portions 50 are recessed portions each having a semicircular vertical cross-section, and are formed in the sheet 24. The sheet 24 is provided on the bottom surface of the lower polarizer 20 of the liquid crystal display element 12. In this case, the sheet 24 is provided on the bottom surface of the lower polarizer 20 in a state where the recessed lens portions 50 are made to correspond to the projected lens portions 21. The decorative layer 36 is formed by using one of the semi-transmissive color ink layer 28 and the semi-transmissive metal layer 32 as in the case of the eighth embodiment.

According to this kind of electronic watch, as in the case of the fourth embodiment, in both light and dark places, the ON regions E1 of the liquid crystal display element 12 become a light-transmitting state. When information such as time is displayed by the ON regions E1, the ON regions E1 are displayed in complex three dimensions through the projected lens portions 21 on the top surface of the liquid crystal display element 12 and the recessed lens portions 50 on the bottom surface of the liquid crystal display element 12. Also at this time, the ON regions E1 are displayed in color or metallically through the decorative layer 36. Thus, in both light and dark places, information displayed on the liquid crystal display element 12 can be represented in color or metallically, and in complex three dimensions through the projected lens portions 21 and the recessed lens portions 50. Accordingly, a wider variety of decorativeness and colorfulness can be obtained, and a more variety of decorative effects can be achieved than in the case of the twelfth embodiment.

Fourteenth Embodiment

Next, a fourteenth embodiment in which the invention is applied to an electronic watch will be described with reference to FIG. 37. Also in this case, the same portions as those of the fourth embodiment shown in FIG. 14 are designated by the same reference numerals for explanation.

This electronic watch includes a liquid crystal display element 55 having a structure of a polymer-dispersed type. The electronic watch otherwise has substantially the same structure as that of the fourth embodiment. The liquid crystal display element 55 is formed to be of a negative type in which a liquid crystal polymer 56 is sealed in between the pair of upper and lower transparent substrates 14 and 15 with the sealing material 18a, and the ON regions E1 where the transparent electrodes 16 and 17 between which a voltage is applied overlap each other become a light-transmitting state. Also in this case, the lens panel 13 is disposed on the top surface of the backlight element 33 via the decorative layer 36. On the top surface of the lens panel 13, the projected lens portions 21 each having a semicircular vertical cross-section are provided so as to correspond to the regions of the liquid crystal display element 55 where the transparent electrodes 16 and 17 overlap each other.

Also in this kind of electronic watch, as in the case of the fourth embodiment, in both light and dark places, the ON regions E1 of the liquid crystal display element 55 become a light-transmitting state. When information such as time is displayed by the ON regions E1, the ON regions E1 are displayed three-dimensionally through the projected lens portions 21 on the top side of the backlight element 33. Also at this time, the ON regions E1 are displayed in color or metallically through the decorative layer 36. Thus, in both light and dark places, information displayed on the liquid crystal display element 55 can be three-dimensionally represented in color or metallically. Consequently, as in the case of the fourth embodiment, a variety of decorative effects can be obtained. Moreover, in particular, since the liquid crystal display element 55 has a structure of a polymer-dispersed type in which the liquid crystal polymer 56 is used, information can be displayed without the polarizers 19 and 20, unlike the liquid crystal display element 12 of the fourth embodiment. Hence, the entire display can be made bright.

In the fourteenth embodiment, the liquid crystal display element 55 is formed to be of a negative type. However, the liquid crystal display element 55 is not limited thereto. For example, the liquid crystal display element 55 may be formed to be of a positive type. In this case, the liquid crystal display element 55 may be formed to be of a positive type by providing the liquid crystal polymer 56 with properties different from those of the above liquid crystal polymer 56 between the pair of upper and lower transparent substrates 14 and 15, so that the ON regions E1 where the transparent electrodes 16 and 17 between which a voltage is applied overlap each other become a light-blocking state. In this case, as in the case of the second embodiment, the projected lens portions 26 in a gently curved convex shape and the decorative layers 27 with a picture, etc., displayed thereon may be provided at points corresponding to the OFF regions E2. With such a structure, as in the case of the second embodiment, when information displayed on the liquid crystal display element 55 is displayed in black, a picture, etc., of the decorative layer 36 can be three-dimensionally represented in a gently curved convex shape at the background portions of the liquid crystal display element 55 through the lens portions 26.

In the fourteenth embodiment and the modification thereof, the projected lens portions 21 or 26 are provided on the lens panel 13. However, the structure of the display device 8 is not limited thereto. For example, as shown in FIG. 21, the projected lens portions 21 made of ultraviolet curable resin may be provided directly on the decorative layer 36. Moreover, the lens portions are not necessarily the projected lens portions 21. As in the cases of the tenth embodiment and the modification thereof shown in FIGS. 31 and 32, respectively, the recessed lens portions 50 may be provided on the bottom surface of the liquid crystal display element 55, i.e., the bottom surface of the lower substrate 15. Alternatively, as in the cases of the eleventh embodiment and the modification thereof shown in FIGS. 33 and 34, respectively, the projected lens portions 21 may be provided on the backlight element 33 side, the recessed lens portions 50 may be provided on the bottom surface of the liquid crystal display element 55, and the lens portions 21 and 50 are disposed so as to correspond to each other. Further, as in the case of the thirteenth embodiment shown in FIG. 36, the projected lens portions 21 and the recessed lens portions 50 may be provided on the top surface and on the bottom surface of the of the liquid crystal display element 55, respectively.

Fifteenth Embodiment

Next, a fifteenth embodiment in which the invention is applied to an electronic watch will be described with reference to FIGS. 38 to 41. Also in this case, the same portions as those of the fourth embodiment shown in FIG. 14 are designated by the same reference numerals for explanation.

This electronic watch is structured such that a plurality of hemispheric lens parts 57 are formed on the lens panel 13, which is disposed below the liquid crystal display element 12, and each of the lens parts 57 is formed in a dot-shape. A semi-transmissive color ink layer 58 is provided on the top surface of the lens panel 13 except points corresponding to the lens parts 57. The electronic watch otherwise has substantially the same structure as that of the fourth embodiment.

Figure 38:
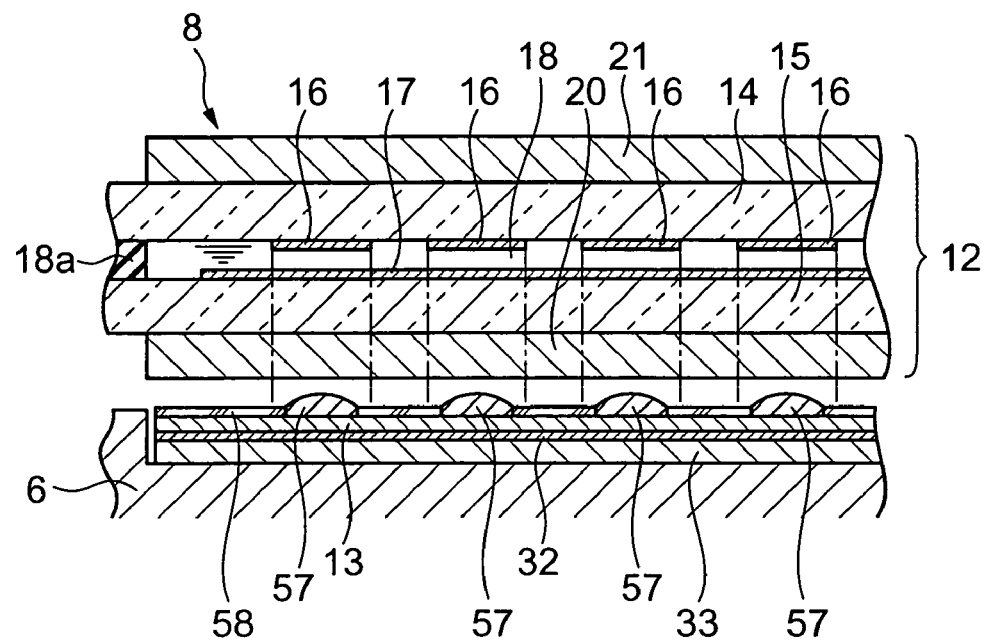
FIG. 38 is an enlarged sectional view of a main part showing a fifteenth embodiment of the invention.
Figure 39:
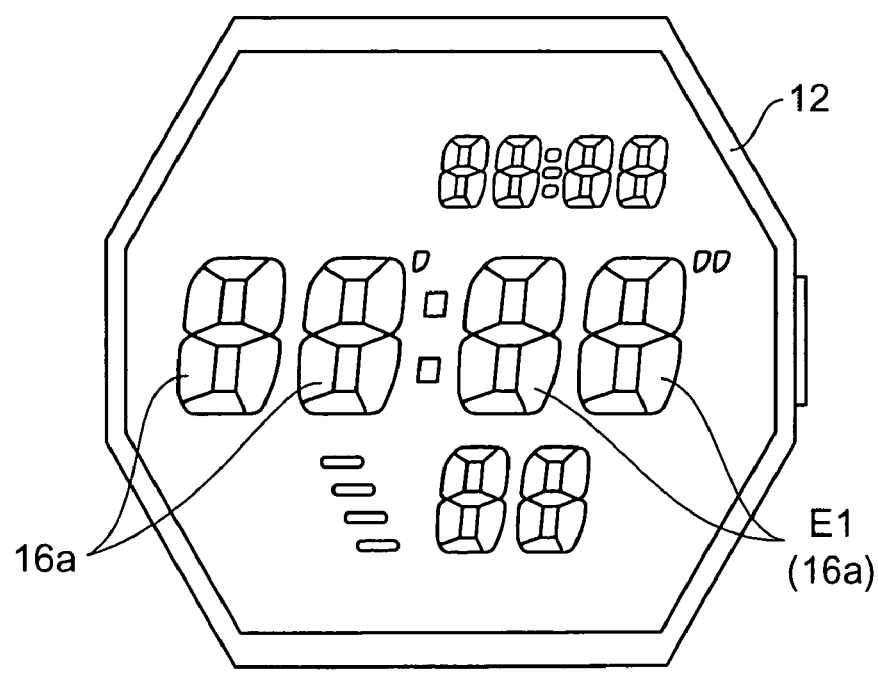
FIG. 39 is an enlarged front view showing a display pattern of the liquid crystal display element in FIG. 38.
Figure 40:
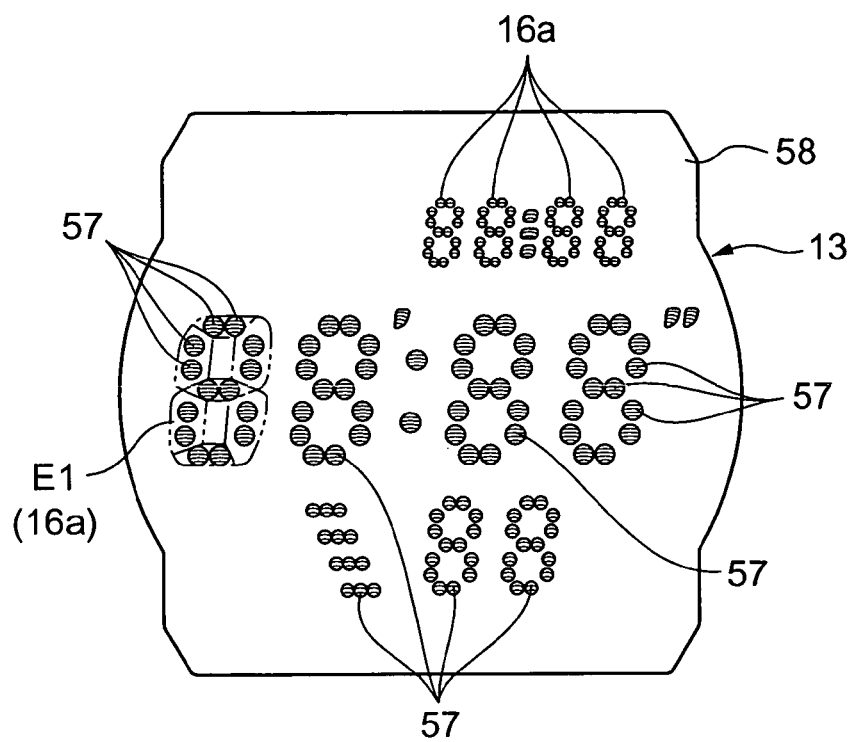
FIG. 40 is an enlarged front view showing a lens panel in FIG. 38.

The lens panel 13 is disposed on the backlight element 33 via the semi-transmissive metal layer 32. As shown in FIGS. 38 and 40, the dot-shaped lens parts 57 are arranged to form a lens portion corresponding to each of the regions where the transparent electrodes 16 and 17 of the liquid crystal display element 12 overlap each other, which regions include the portions corresponding to the ON regions E1. Similarly, on the top surface of the lens panel 13, the color ink layer 58 is provided in the regions where the transparent electrodes 16 and 17 of the liquid crystal display element 12 overlap each other, which regions include the portions corresponding to the ON regions E1, except the lens parts 57. If the entire display screen is colored through the polarizers 19 and 20 of the liquid crystal display element 12, the color ink layer 58 is preferably colored in a similar color or in a complementary color to that of the display screen.

Figure 41:
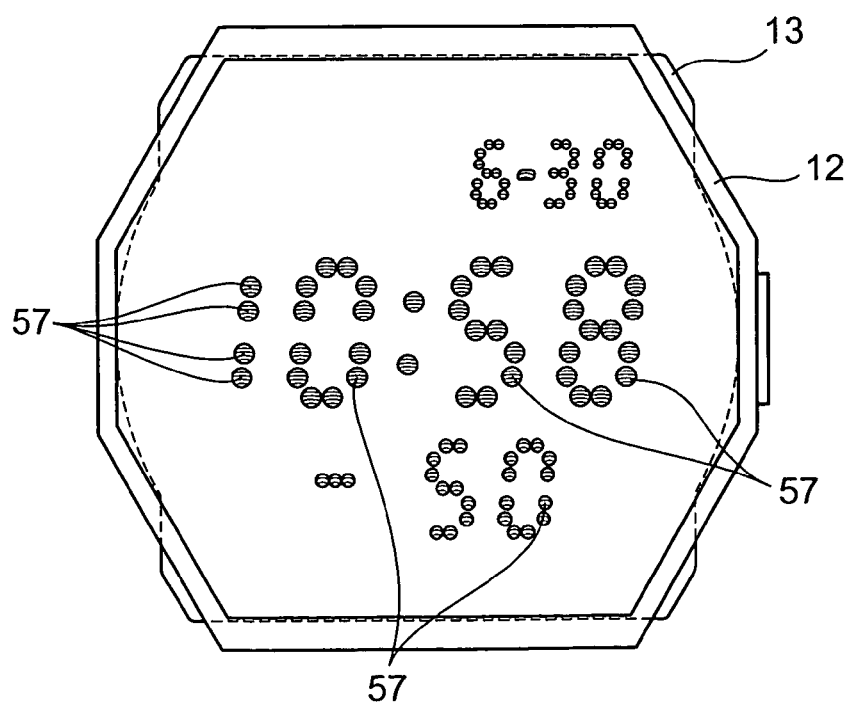
FIG. 41 is an enlarged front view showing a display state of the liquid crystal display element in FIG. 38.

If the color ink layer 58 is in a similar color to that of the display screen of the liquid crystal display element 12, when the liquid crystal display element 12 is driven to display information, the ON regions E1 are displayed three-dimensionally with a dotted pattern through the plurality of lens parts 57 as shown in FIG. 41. If the color ink layer 58 is in a complementary color to that of the display screen of the liquid crystal display element 12, when the liquid crystal display element 12 is driven to display information, the ON regions E1 are colored in a different color from that of the background of the ON regions E1, and the colored ON regions E1 are displayed three-dimensionally with a dotted pattern through the plurality of lens portions. Here, the semi-transmissive metal layer 32 formed by using a thin metal film is provided on the bottom surface of the lens panel 13.

Also in this kind of electronic watch, in both light and dark places, the ON regions E1 of the liquid crystal display element 12 become a light-transmitting state. When information such as time is displayed by the ON regions E1, the ON regions E1 are displayed three-dimensionally with a dotted pattern through the lens parts 57, as shown in FIG. 41. At this time, the information is represented metallically through the metal layer 32 on the bottom surface of the lens panel 13, and, through the color ink layer 58, the ON regions E1 are displayed metallically in color or only metallically. Thus, information displayed on the liquid crystal display element 12 can be three-dimensionally represented in color and metallically, or only metallically, with a dotted pattern.

In this case, if the color ink layer 58 is in a similar color to that of the display screen of the liquid crystal display element 12, through the plurality of lens parts 57, the ON regions E1 are displayed three-dimensionally and metallically with a dotted pattern, as shown in. FIG. 41. If the color ink layer 58 is in a complementary color that is different from the color of the display screen of the liquid crystal display element 12, the ON regions E1 are colored in a different color from that of the background portion thereof through the color ink layer 58, and, through the plurality of lens parts 57, the colored ON regions E1 are displayed three-dimensionally and metallically. Thus, in both light and dark places, information displayed on the liquid crystal display element 12 can be three-dimensionally represented in color and metallically with a dotted pattern. Consequently, a variety of decorative effects can be obtained.

Figure 42:
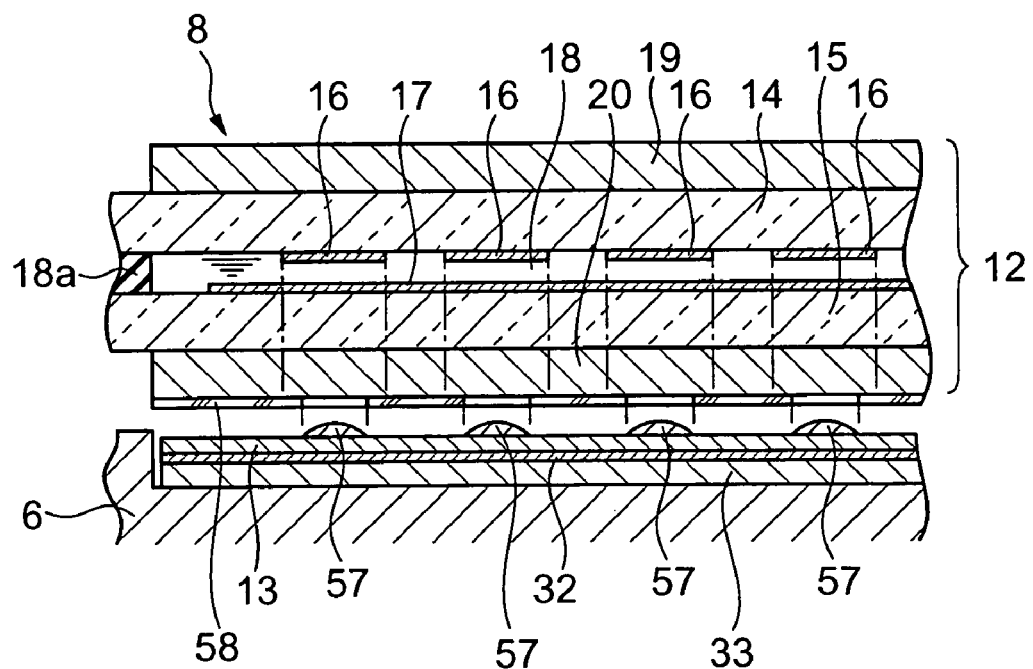
FIG. 42 is an enlarged sectional view of a display device showing a modification of the fifteenth embodiment in which a color ink layer in FIG. 38 is provided on the bottom surface of the liquid crystal display element.

In the fifteenth embodiment, the color ink layer 58 is provided on the top surface of the lens panel 13. However, the color ink layer 58 is not limited thereto. For example, as shown in FIG. 42, the color ink layer 58 may be provided on the bottom surface of the lower surface of the liquid crystal display element 12, i.e., the bottom surface of the lower polarizer 20. Also in this case, the color ink layer 58 is provided in the regions where the transparent electrodes 16 and 17 of the liquid crystal display element 12 overlap each other, which regions include the portions corresponding to the ON regions E1, except the lens portions 57. Additionally, as in the case of the fifteenth embodiment, if the entire display screen is colored through the upper and lower polarizers 19 and 20 of the liquid crystal display element 12, this color ink layer 58 is preferably colored in a similar color or complementary color to that of the display screen.

Figure 43:
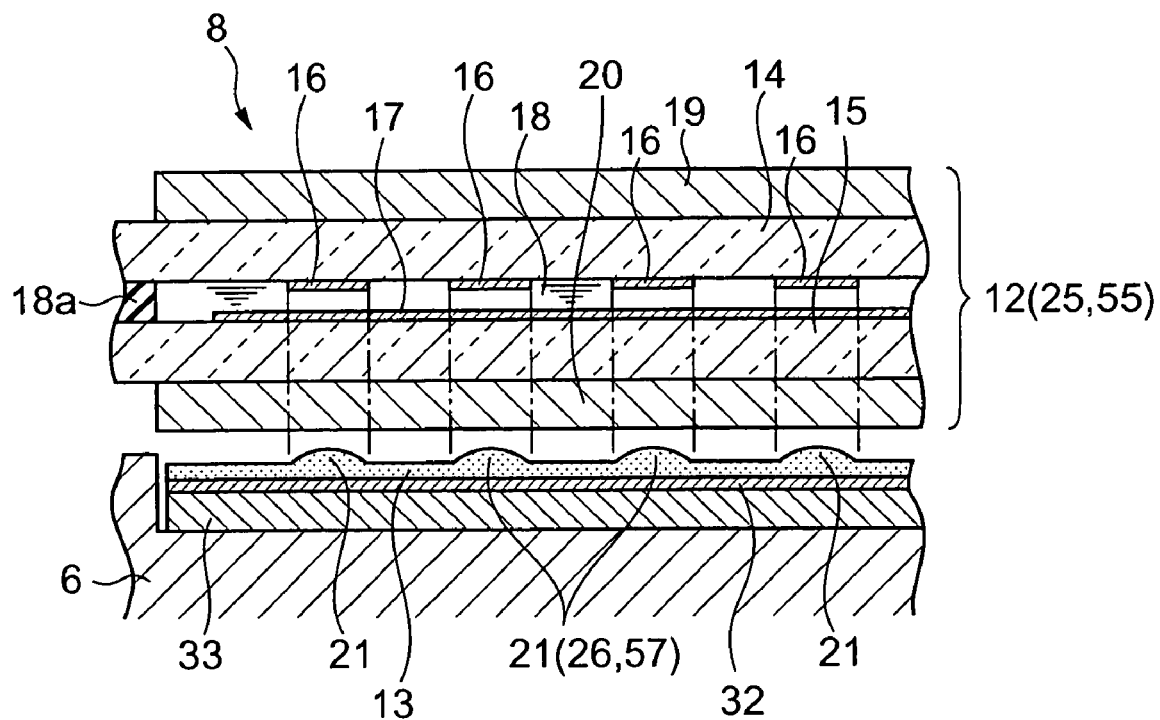
FIG. 43 is an enlarged sectional view of a display device showing a modification of the embodiments and the modifications thereof in which a lens panel and lens portions are colored in a semi-transmissive state.
Figure 44:
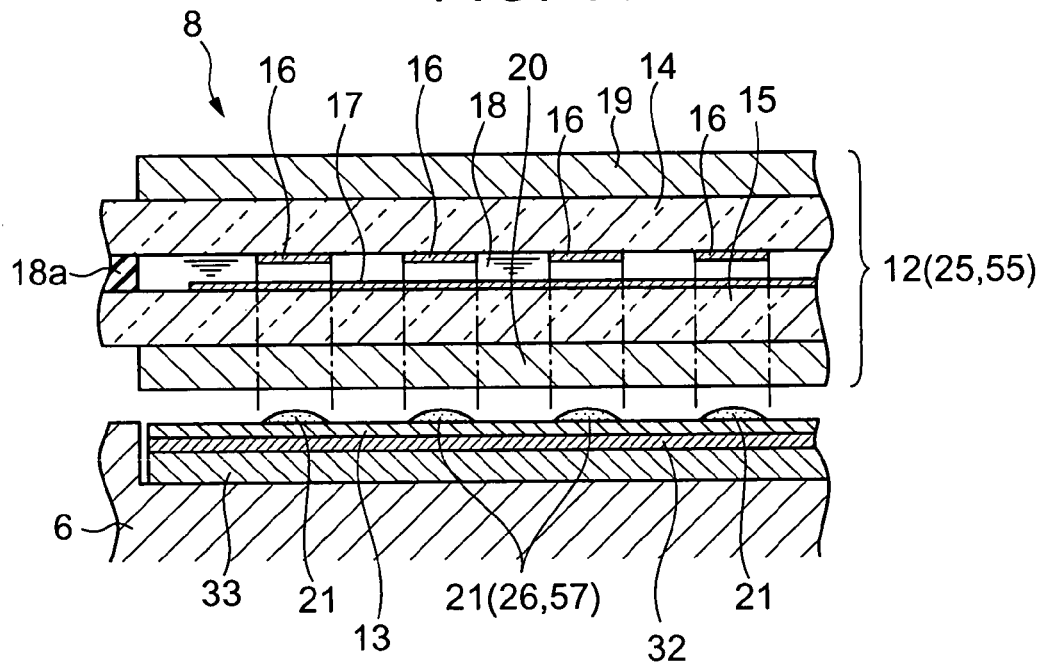
FIG. 44 is an enlarged sectional view of a display device showing a modification of the embodiments and the modifications thereof in which only the lens portions are colored.

In the first to fifteenth embodiments and the modifications thereof, the lens panel 13, the projected lens portions 21 and 26, and the lens parts 57 are formed to be transparent or translucent. However, they are not limited thereto. For example, as shown in FIG. 43, all of the lens panel 13, lens portions 21 and 26, and lens parts 57 may be colored in a semi-transmissive state, thereby representing the liquid crystal display element 12 (or 25, 55) in color. Alternatively, as shown in FIG. 44, only the projected lens portions 21 and 26 and the lens parts 57 may be colored in a semi-transmissive state, thereby representing the liquid crystal display element 12 (or 25, 55) in color.

Figure 45A:
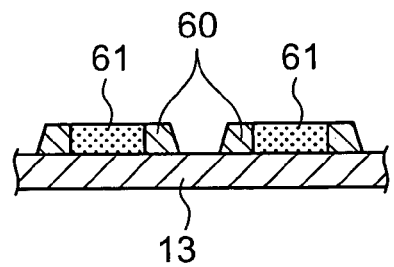
Figure 45B:
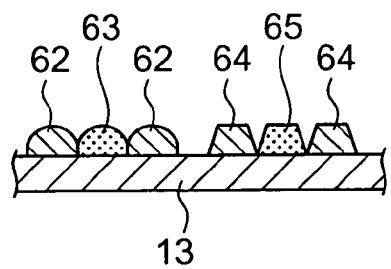
Figure 45C:
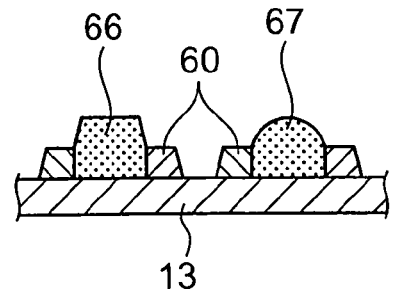

Moreover, in the first to fifteenth embodiments and the modifications thereof, the projected lens portions 21, 26 or 38, lens parts 57, or recessed lens portions 23 or 50 in the same shape are provided on the same plane. However, the lens portions and lens parts are not limited thereto. For example, as shown in FIGS. 45A to 45C, a plurality of types of projected lens parts different in shape and/or color may be combined and provided two-dimensionally. For example, as shown in FIG. 45A, first lens parts 60 each having a substantially trapezoidal vertical cross-section may be provided on the top surface of the lens panel 13 at predetermined intervals, and each of colored second lens parts 61 may be provided between two of the first lens parts 60 to form a lens portion.

Moreover, as shown in FIG. 45B, first lens parts 62 each having a semicircular vertical cross-section may be provided on the top surface of the lens panel 13 at predetermined intervals, and each of colored second lens parts 63 may be provided between two of the first lens parts 62. In addition to this, third lens parts 64 each having a trapezoidal vertical cross-section may be provided at predetermined intervals, and each of fourth lens parts 65 each having a trapezoidal vertical cross-section and differently colored may be provided between two of the third lens parts 64.

Alternatively, as shown in FIG. 45C, the first lens parts 60 each having a substantially trapezoidal vertical cross-section may be provided on the top surface of the lens panel 13 at predetermined intervals, and each of colored, substantially trapezoidal second lens parts 66 higher than the first lens parts 60 may be provided between two of the first lens parts 60. In addition to this, between another two of the first lens parts 60, each of semicircular third lens parts 67 higher than and differently colored from the first lens parts 60 may be provided. With any configuration described above, modes of display in a complex three dimensions made through the plurality of lens parts 60 to 67 different in shape and/or color can be obtained. Thus, a more variety of decorative effects with more decorativeness and colorfulness can be achieved.

Figure 46A:
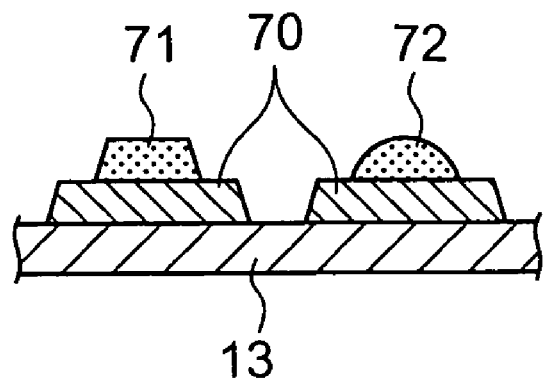
Figure 46B:
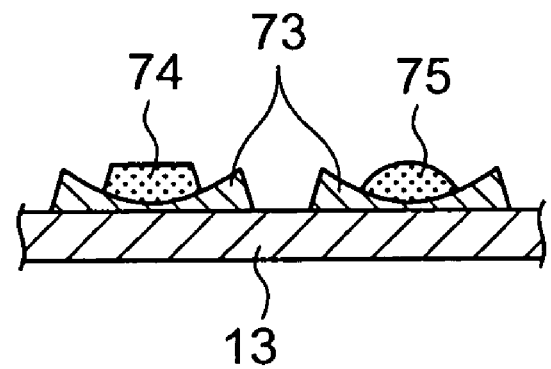
Figure 46C:
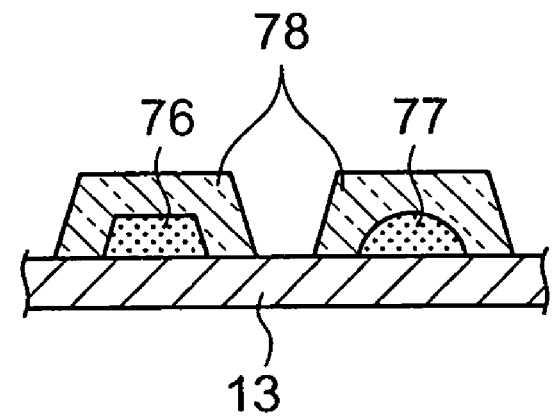

Further, in the first to fifteenth embodiments and the modifications thereof, the projected lens portions 21, 26 or 38, lens parts 57, or recessed lens portions 23 or 50 are provided two-dimensionally. However, the lens portions and lens parts are not limited thereto. For example, as shown in FIGS. 46A to 46C, a plurality of types of lens parts different in shape and/or color may be stacked on each other. For example, as shown in FIG. 46A, a plurality of first lens parts 70 each having a trapezoidal vertical cross-section may be provided on the lens panel 13. Each of colored second lens parts 71 each having a trapezoidal vertical cross-section and being smaller than the first lens parts 70 may be stacked on a part of the first lens parts 70. Each of colored third lens parts each having a semicircular vertical cross-section and being smaller than the first lens parts 70 may be stacked on the other part of first lens parts 70.

Moreover, as shown in FIG. 46B, a plurality of first lens parts 73 whose top surface is formed in a concave shape may be provided on the lens panel 13. Each of colored second lens parts 74 each having a trapezoidal vertical cross-section and is smaller than the first lens parts 73 may be provided on a part of the first lens parts. Each of colored third lens parts 75 each having a semicircular vertical cross-section may be provided on the other part of the first lens parts 73.

Furthermore, as shown in FIG. 46C, colored first lens parts 76 each having a trapezoidal cross-section, and colored second lens parts 77 may be provided on the lens panel 13 each having a semicircular vertical cross-section may be provided. Each of the first and second lens parts 76 and 77 may be covered with each of transparent third lens parts 78. With any one of the aforementioned configurations, modes of display in complex three dimensions can be obtained through the plurality of lens parts 70 to 78 different in shape and/or color. Thus, a more variety of decorative effects with more decorativeness and colorfulness can be obtained.

Sixteenth Embodiment

Next, a sixteenth embodiment in which a manufacturing method of the display device according to the invention is applied to an electronic watch will be described with reference to FIGS. 47 to 49. In this case, the same portions as those of the fourth embodiment shown in FIG. 14 are designated by the same reference numerals for explanation.

Figure 47:
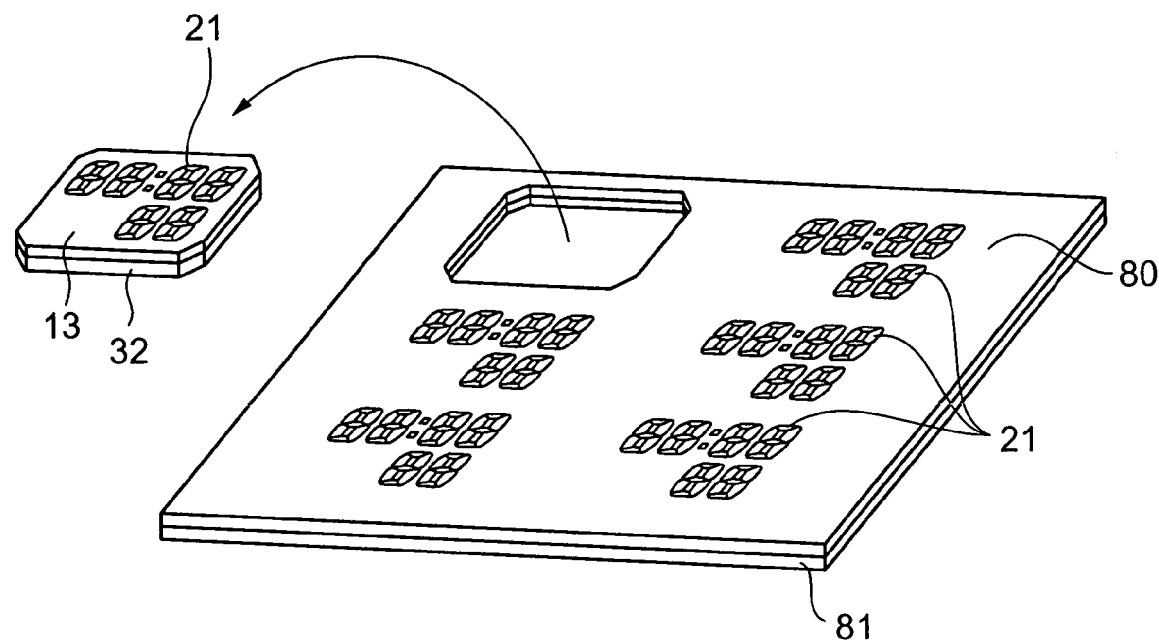
FIG. 47 is a perspective view showing a state where a lens panel is manufactured by a manufacturing method of a sixteenth embodiment of the invention.

According to the manufacturing method of the display device 8 in the electronic watch, first, in a first step, the lens portions 21 are formed on the top surface of the lens panel 13, and the metal layer 32 is provided on the bottom surface of the lens panel 13, as shown in FIG. 47.

In other words, in the first step, as shown in FIG. 47, a base panel 80 with a size large enough to arrange the plurality of lens panels 13 thereon is prepared. A metal plate 81 is adhered over the entire bottom surface of the base panel 80, and the lens portions 21 are formed in this state in respective regions corresponding to the plurality of lens panels 13. At this time, positioning marks for cutting are preferably provided for each of the lens panels 13. Then, the base panel 80, on which the lens portions 21 are formed, is cut region by region together with the metal plate 81. Thus, the plurality of lens panels 13 each having the metal layer 32 on the bottom surface thereof can be formed at once.

Figure 48A:
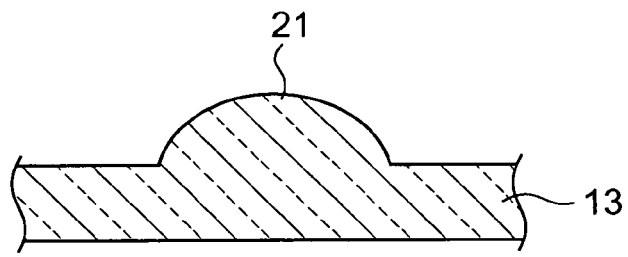
Figure 48B:
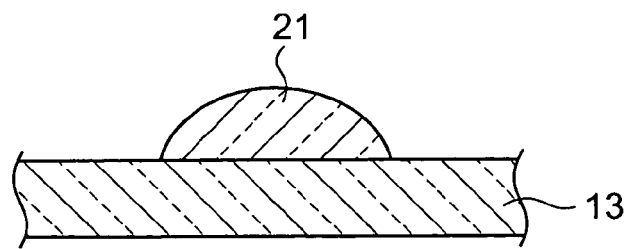
Figure 48C:
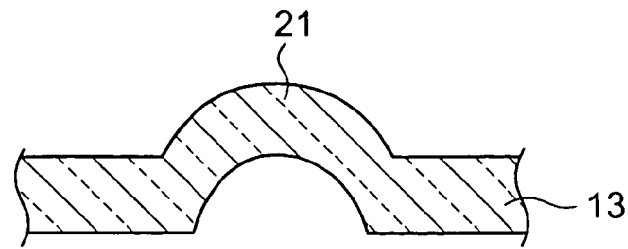

In this case, to form the lens portions 21 on the lens panels 13, there are methods as follows: a method in which, as shown in FIG. 48A, the lens portions 21 are molded integrally with the lens panels 13 simultaneously with the molding of the lens panels 13; a method in which, as shown in FIG. 48B, after ultraviolet curable resin is applied on the lens panels 13 by printing, the lens panels 13 are irradiated with ultraviolet rays to cure the ultraviolet curable resin, thereby forming the lens portions 21; and a method in which, as shown in FIG. 48C, the lens portions 21 are formed by embossing the lens panels 13. The lens portions 21 may be formed by one of the above methods.

Figure 49:
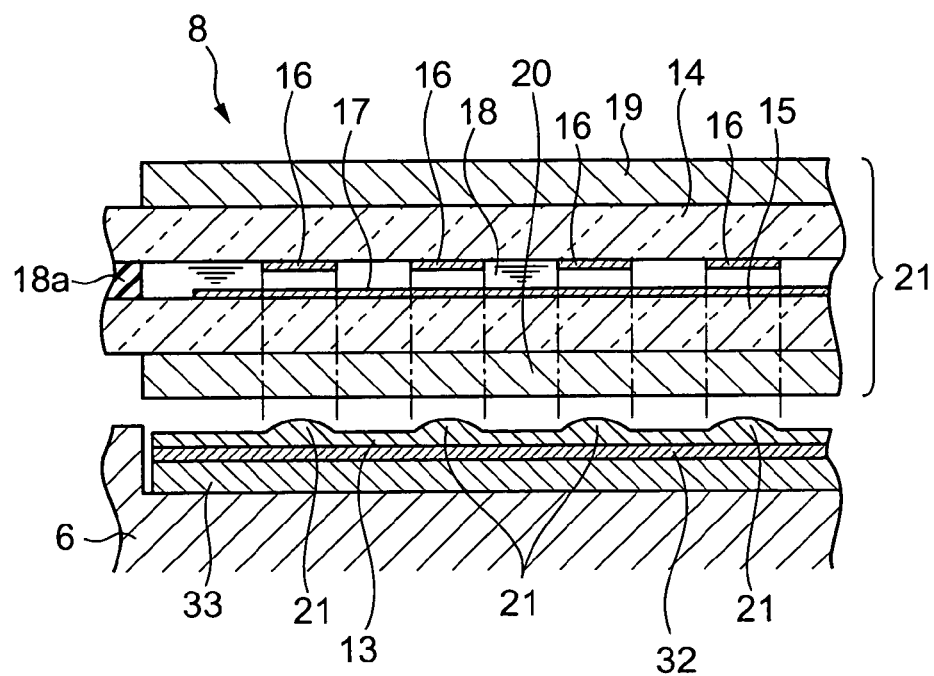
FIG. 49 is an enlarged sectional view of a display device showing a state where the lens panel manufactured in FIG. 47 is positioned below a liquid crystal display element.

Next, as shown in FIG. 49, in a second step, the lens panel 13 provided with the metal layer 32 is positioned under the liquid crystal display element 12. In this second step, the lens portions 21 provided on the lens panel 13 are disposed to correspond to the regions where the transparent electrodes 16 and 17 of the liquid crystal display element 12 overlap each other, and the lens panel 13 is positioned under the liquid crystal display element 12. Thus, the display device 8 can be manufactured well as well as accurately and easily.

Figure 50:
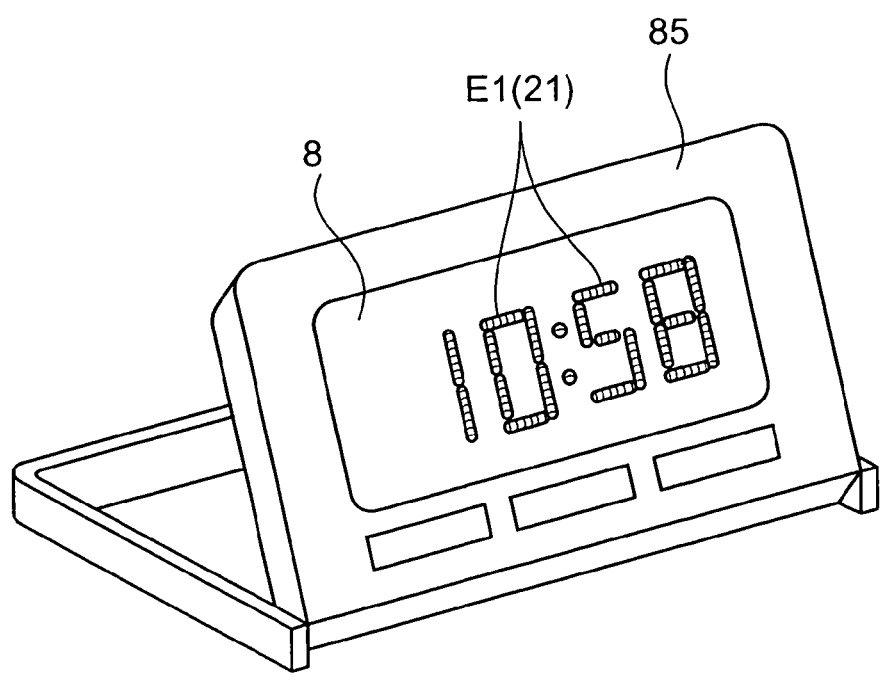
FIG. 50 is a perspective view of a travel watch to which a display device of the invention is applied.
Figure 51:
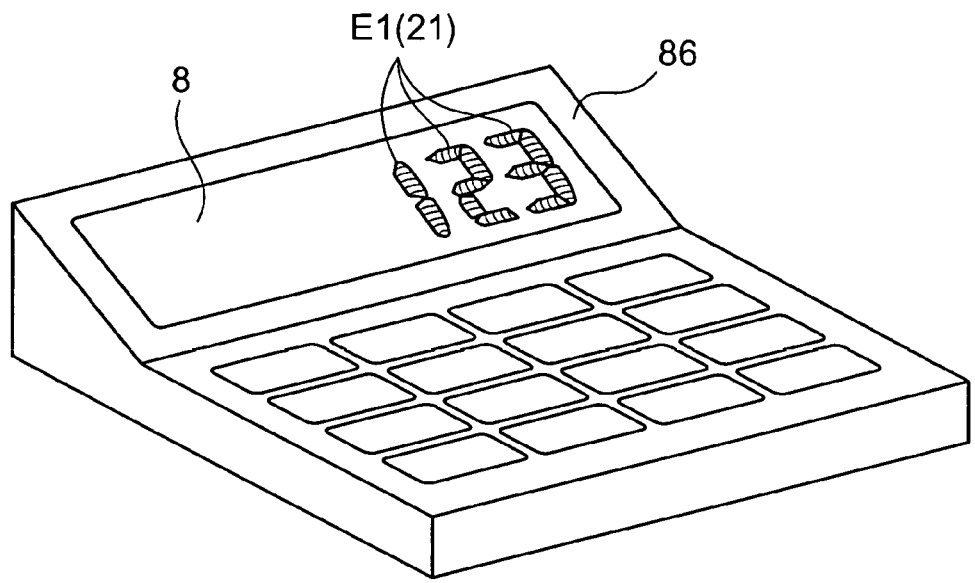
FIG. 51 is a perspective view of a calculator to which a display device of the invention is applied.

In the first to sixteenth embodiments and the modifications thereof, the invention is applied to an electronic watch. However, application of the invention is not limited thereto. For example, the invention can be applied to a travel watch 85, a calculator 86, and a cellular phone 87 shown in FIGS. 50, 51, and 52, respectively. In addition to these, the invention can be widely applied to electronic devices such as an electronic dictionary and an electronic organizer, or various devices such as meters of a car.

As described above, the embodiments shown in FIGS. 1 to 6 and FIGS. 12 to 52 comprise: a liquid crystal display element (12, 55) having a flat plate shape where a transparent electrode (16, 17) to which a voltage is applied is provided on a transparent substrate (14, 15); and a lens portion (21, 23, 38, 48, 50, 57, 60, 62, 70, 73, 76, 61, 63, 66, 71, 74, 77, 64, 67, 72, 75, 78, 65) disposed on at least one of a front surface side and a back surface side of the liquid crystal display element, wherein the lens portion and the transparent electrode are positioned to correspond to each other.

In the embodiments shown in FIGS. 1 to 6 and FIGS. 12 to 52, the lens portion and the transparent electrode are formed in the same shape.

The embodiments shown in FIGS. 1 to 6 and FIGS. 12 to 52 comprises a plurality of sets each of which comprises the lens portion and the transparent electrode.

In the embodiment shown in FIGS. 38 to 42, the lens portion comprises a plurality of lens parts (57) which correspond to the transparent electrode (16).

The embodiments shown in FIGS. 1 to 6 and FIGS. 12 to 52 comprise: a liquid crystal display element (12, 55) which includes a pair of transparent substrates (14, 15), a pair of transparent electrodes (16, 17) on opposed surfaces of the pair of transparent substrates, and a liquid crystal (liquid crystal 18, liquid crystal polymer 56) provided between the pair of substrates; and a lens portion (21, 23, 38, 48, 50, 57, first lens part 60, 62, 70, 73, 76, second lens part 61, 63, 66, 71, 74, 77, third lens part 64, 67, 72, 75, 78, fourth lens part 65) disposed on an outer side of at least one of a front surface and a back surface of the liquid crystal display element, wherein the lens portion is disposed to correspond to at least a part of regions where the pair of transparent electrodes of the liquid crystal display element correspond to each other.

According to the embodiments, a lens portion disposed on an outer side of one of a front surface side and a back surface side of the liquid crystal display element is made to correspond to at least a part of the regions where the pair of transparent electrodes of the liquid crystal display element correspond to each other. When a voltage is selectively applied to the regions where the pair of transparent electrodes correspond to each other to have the ON regions E1, the ON regions E1 become a light-transmitting state. Information can be thus displayed on the liquid crystal display element. Moreover, the information displayed on the liquid crystal display element can be represented three-dimensionally through the lens portion. Thus, information displayed on the liquid crystal display element can be represented three-dimensionally, and hence highly decorative display can be obtained.

The embodiments shown in FIGS. 1 to 6 and FIGS. 12 to 52 comprise: a liquid crystal display element (12, 55) which includes a pair of transparent substrates (14, 15), a pair of transparent electrodes (16, 17) on opposed surfaces of the pair of transparent substrates, and a liquid crystal (liquid crystal 18, liquid crystal polymer 56) provided between the pair of substrates; and a panel (lens panel 13) having a lens portion (21, 23, 38, 48, 50, 57, first lens part 60, 62, 70, 73, 76, second lens part 61, 63, 66, 71, 74, 77, third lens part 64, 67, 72, 75, 78, fourth lens part 65) disposed on an outer side of at least one of a front surface and a back surface of the liquid crystal display element, wherein the lens portion is disposed to correspond to at least a part of regions where the pair of transparent electrodes of the liquid crystal display element correspond to each other.

According to the embodiments, when disposing a panel on an outer side of one of a front surface side and a back surface side of the liquid crystal display element, the lens portion provided on the panel is made to correspond to at least a part of the regions where the pair of transparent electrodes of the liquid crystal display element correspond to each other. When a voltage is selectively applied to the regions where the pair of transparent electrodes correspond to each other to have the ON regions E1, the ON regions E1 become a light-transmitting state. Information can be thus displayed on the liquid crystal display element. Moreover, the information displayed on the liquid crystal display element can be represented three-dimensionally through the lens portion. Thus, information displayed on the liquid crystal display element can be represented three-dimensionally, and hence highly decorative display can be obtained.

In the embodiments shown in FIGS. 12 to 52, a decorative layer (color ink layer 28, 58, metal layer 32, decorative layer 35, 36, 40, 45) is provided on at least one of a front surface side and a back surface side of the lens portion (21, 23, 38, 48, 50, 57).

According to the embodiments, the decorative layer is provided on at least one of the front surface side and the back surface side of the lens portion. Thus, the ON regions E1 can be represented three-dimensionally through the lens portion. In particular, decorative effects can be added through the decorative layer, whereby a variety of decorative effects can be obtained.

The embodiment shown in FIGS. 7 to 11 comprise: a liquid crystal display element (25) which includes a pair of transparent substrates (14, 15), a pair of transparent electrodes (16, 17) on opposed surfaces of the pair of transparent substrates, and a liquid crystal (18) provided between the pair of substrates; and a panel (lens panel 13) disposed on a back surface side of the liquid crystal display element, the panel having a lens portion (26) and a decorative layer (27), wherein the lens portion and the decorative layer are disposed in a region other than regions where the pair of transparent electrodes of the liquid crystal display element correspond to each other.

According to the embodiment, when the panel having the lens and the decorative portion is disposed on the back surface side of the liquid crystal display element, the lens portion and the decorative layer are disposed in a region other than regions where the pair of transparent electrodes of the liquid crystal display element correspond to each other. The OFF regions E2 which are relevant to the background where the pair of transparent electrodes of the liquid crystal display element are not opposed each other become a light-transmitting state. In both cases where information is displayed by selectively causing the regions where the pair of transparent electrodes correspond to each other to be the ON regions E1, and where no information is displayed on the liquid crystal display element, a part of or the entire decorative layer can be represented three-dimensionally in the OFF regions E2 which are relative to the background of the liquid crystal display element. Thus, even when information is displayed on the liquid crystal display element, a part of or the entire decorative layer can be represented three-dimensionally at the background portions of the liquid crystal display element without becoming an obstacle to the displayed information. Accordingly, highly decorative display can be obtained.

In the embodiment shown in FIGS. 7 to 11, the lens portion (26) and the decorative layer (27) correspond to and overlap each other.

According to the invention, the lens portion and the decorative layer correspond to and overlap each other. Thus, even when information is displayed on the liquid crystal display element, the entire decorative layer can be represented three-dimensionally at the background portions of the liquid crystal display element without becoming an obstacle to the displayed information. Accordingly, highly decorative display can be obtained.

Figure 37:
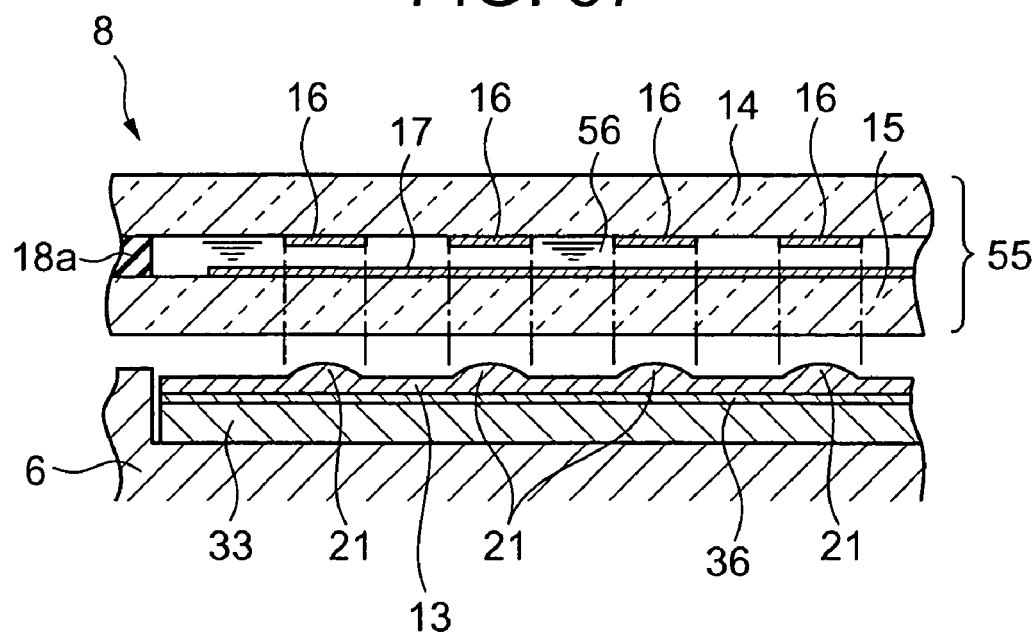
FIG. 37 is an enlarged sectional view of a main part showing a fourteenth embodiment of the invention.

In the embodiment shown in FIG. 37, the liquid crystal display element (55) is formed to be of a polymer dispersed type in which a liquid crystal polymer (56) is provided between the pair of substrates (14, 15) as the liquid crystal.

According to the embodiment, the liquid crystal display element is formed to be of a polymer dispersed type in which a liquid crystal polymer is provided between the pair of substrates as the liquid crystal. Thus, when the ON regions E1 or OFF regions E2 become a light-transmitting state, information displayed on the liquid crystal display element can be represented three-dimensionally, and, through the lens portion, the decorative layer can be represented three-dimensionally at the portion corresponding to the background of the liquid crystal display element. In particular, since the liquid crystal display element is formed to be of a polymer dispersed type using a liquid crystal polymer, the information can be displayed without a polarizer, thereby making the display bright.

In the embodiments shown in FIGS. 12 to 52, the decorative layer (35, 36, 40, 45) comprises at least one of a color ink layer (28) and a metal layer (32).

According to the embodiments, when the decorative layer is a semi-transmissive color ink layer, the ON regions E1 or the OFF regions E2 can be represented in color through the color ink layer. When the decorative layer is a metal layer, the ON regions E1 or OFF regions E2 can be represented metallically through the metal layer. Moreover, when the decorative layer includes the color ink layer and the metal layer stacked on each other, the ON regions E1 and the OFF regions E2 can be represented metallically in color. Thus, a variety of decorative representation can be achieved, and a more highly decorative display can be obtained.

In the embodiment shown in FIGS. 16A to 16C, the decorative layer comprises a polarizing film (34) formed by using a multi-layered film.

According to the embodiment, the decorative layer comprises a polarizing film formed by using a multi-layered film. Thus, displayed information or the background thereof can be represented metallically. At this time, a liquid crystal of a twist nematic type is provided between the pair of substrates of the liquid crystal display element. When the pair of polarizers provided on the front and back surfaces of the liquid crystal display element are disposed such that the absorption axes or the transmission axes thereof are parallel to each other, and the ON regions E1 are caused to become light-transmissive state through the pair of transparent electrodes to display information, the information displayed on the liquid crystal display element is can be represented three-dimensionally through the lens portion, as well as metallically through the polarizing film. Thus, a high-class display can be obtained.

In the embodiments shown in FIGS. 1 to 9, FIG. 33, FIG. 34, and FIGS. 37 to 52, the lens portion (21, 23, 26, 38, 48, 50, 57, first lens part 60, 62, 70, 73, 76, second lens part 61, 63, 66, 71, 74, 77, third lens part 64, 67, 72, 75, 78, fourth lens part 65) is provided integrally with the panel (lens panel 13).

According to the embodiments, the lens portion is provided integrally with the panel. Thus, regions can be represented three-dimensionally through the lens portion and lens part, and, through the lens portion, the decorative layer can be represented three-dimensionally in the background that is a region. In particular, by forming the lens portion integrally with the panel through injection molding or embossing, the manufacture thereof and assembling work become easy, and thus inexpensive display devices can be obtained.

Figure 52:
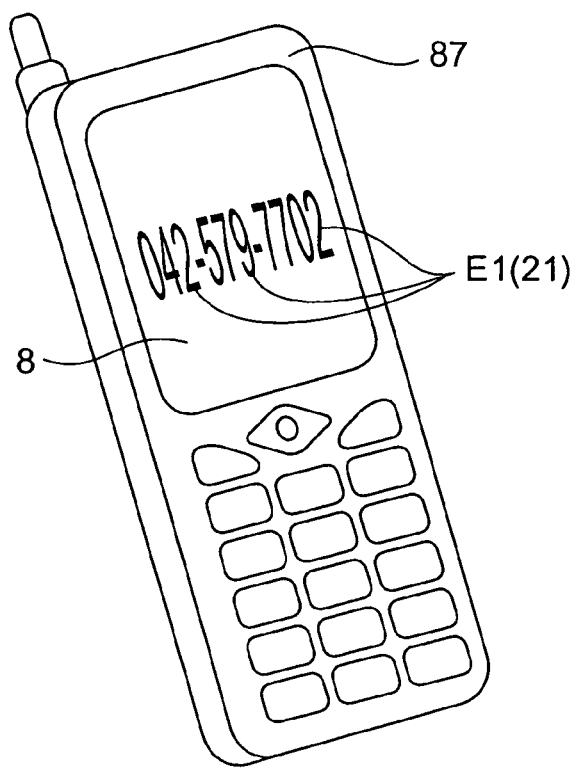
FIG. 52 is a perspective view of a cellular phone to which a display device of the invention is applied.

In the embodiments shown in FIGS. 1 to 52, the lens portion (21, 23, 26, 38, 48, 50, 57, first lens part 60, 62, 70, 73, 76, second lens part 61, 63, 66, 71, 74, 77, third lens part 64, 67, 72, 75, 78, fourth lens part 65) is formed in at least one of a projected shape and a recessed shape.

According to the embodiments, the lens portion is formed in at least one of a projected shape and a recessed shape. Thus, the ON regions E1 or the OFF regions E2 can be represented three-dimensionally in a projected shape or recessed shape. Moreover, by providing the projection and recess in combination, the ON regions E1 or the OFF regions E2 can be represented in complex three dimensions in which the projection and recess are combined.

In the embodiments shown in FIGS. 1 to 37, and FIGS. 43 to 52, the lens portion (21, 23, 38, 48, 50, 57, first lens part 60, 62, 70, 73, 76, second lens part 61, 63, 66, 71, 74, 77, third lens part 64, 67, 72, 75, 78, fourth lens part 65) has one of a semicircular vertical cross-section and a polygonal vertical cross-section, and is formed in substantially the same shape as that of each of the regions where the pair of transparent electrodes (16, 17) correspond to each other.

According to the embodiments, the lens portion has one of a semicircular vertical cross-section and a polygonal vertical cross-section, and is formed in substantially the same shape as that of each of the regions where the pair of transparent electrodes correspond to each other. Thus, the ON regions E1 that become a light-transmissive state can be represented three-dimensionally in a semicircular or polygonal projected or recessed shape through the lens portion. Also in this way, decorative effects can be added.

In the embodiment shown in FIGS. 38 to 42, the lens portion has one of a semicircular vertical cross-section and a polygonal vertical cross-section, and the lens portion comprises a plurality of dot-shaped lens parts (57) for each of the regions where the pair of transparent electrodes (16, 17) correspond to each other.

According to the embodiment, the lens portion has one of a semicircular vertical cross-section and a polygonal vertical cross-section, and the lens portion comprises a plurality of dot-shaped lens parts for each of the regions where the pair of transparent electrodes correspond to each other. Thus, the ON regions E1 that become a light-transmissive state can be represented three-dimensionally with a dotted pattern through the plurality of dot-shaped lens parts arranged in the ON regions E1. Also in this way, decorative effects can be added.

In the embodiment shown in FIGS. 27 to 29C, the lens portion (38) is formed in a shape where a top surface and a rising surface are included, and a decorative layer (40, first and second decorative layers 41 and 42) is provided on at least one of the top surface and the rising surface.

According to the embodiment, the lens portion is formed in a shape where a top surface and a rising surface are included, and a decorative layer is provided on at least one of the top surface and the rising surface. Thus, through the decorative layer provided on at least one of the top surface and the rising surface of the lens portion, decorative effects of colors can be partially added, and a wider variety of modes of display on the liquid crystal display element can be achieved. Also in this way, decorative effects can be enhanced.

In the embodiments shown in FIGS. 43 and 44, the lens portion (21, 38, 48) is colored in a semi-transmissive state.

According to the embodiments, the lens portion is colored in a semi-transmissive state. Thus, when the ON regions E1 or the OFF regions E2 that become a light-transmissive state are represented three-dimensionally through the lens portion, the ON regions E1 or the OFF regions E2 can be represented three-dimensionally in color in accordance with the color put on the lens portion. Also in this way, a variety of decorative effects can be obtained.

In the embodiment shown in FIGS. 45A to 45C, the lens portion comprises a plurality of types of lens parts (first lens part 60, 62, second lens part 61, 63, 66, third lens part 64, 67, fourth lens part 65) different in shape and/or color which are combined and arranged two-dimensionally.

According to the embodiment, the lens portion comprises a plurality of types of lens parts different in shape and/or color which are combined and arranged two-dimensionally. Thus, when the ON regions E1 or the OFF regions E2 that become a light-transmitting state are represented three-dimensionally through the lens portion, information displayed on the liquid crystal display element can be represented three-dimensionally through the plurality of types of lens parts different in shape and/or color. Hence, a more variety of modes of display can be achieved, and thus a variety of decorative effects can be obtained.

In the embodiment shown in FIGS. 46A to 46C, the lens portion comprises a plurality of types of lens parts (first lens part 70, 73, 76, second lens part 71, 74, 77, third lens part 72, 75, 78) different in shape and/or color which are combined and stacked on each other.

According to the embodiment, the lens portion comprises a plurality of types of lens parts different in shape and/or color which are combined and stacked on each other. Thus, when the ON regions E1 or the OFF regions E2 that become a light-transmitting state can be represented three-dimensionally through the lens portion, information displayed on the liquid crystal display element can be represented in complex three dimensions trough the plurality of types of lens parts different in shape and/or color that are stacked on each other. Consequently, a wider variety of modes of display can be achieved, and a more variety of decorative effects can be obtained.

The embodiments shown in FIGS. 12 to 52 further comprise a backlight member (backlight device 29, backlight element 33) which illuminates the liquid crystal display element (12, 25, 55).

According to the embodiments, a backlight member which illuminates the liquid crystal display element is further comprised. Thus, when one of the ON regions E1 or OFF regions E2 become a light-transmitting state, information displayed on the liquid crystal display element can be represented three-dimensionally through the lens portion. The decorative layer can be represented three-dimensionally in the background of the display element through the lens portion. Moreover, in particular, since the liquid crystal display element can be illuminated by the backlight member, the displayed information or the background thereof can be brightly displayed in both light and dark places.

The embodiment shown in FIGS. 47 to 49 is a manufacturing method of a display device including: a liquid crystal display element (12) which includes a pair of transparent substrates (14, 15), a pair of transparent electrodes (16, 17) on opposed surfaces of the pair of transparent substrates, and a liquid crystal (18) provided between the pair of substrates; and a panel (lens panel 13) having a lens portion (21) disposed on an outer side of at least one of a front surface and a back surface of the liquid crystal display element, in which the lens portion is disposed to correspond to at least a part of regions where the pair of transparent electrodes of the liquid crystal display element correspond to each other, the manufacturing method comprising: a panel manufacturing step of providing the lens portion on the panel; and a panel attaching step of disposing the panel on the outer side of at least one of the front surface and the back surface of the liquid crystal display element in a state where the lens portion is caused to correspond to at least the part of the regions where the pair of transparent electrodes of the liquid crystal display element correspond to each other.

According to the embodiment, a panel manufacturing step of providing the lens portion on the panel, and a panel attaching step of disposing the panel on the outer side of at least one of the front surface and the back surface of the liquid crystal display element in a state where the lens portion is caused to correspond to at least the part of the regions where the pair of transparent electrodes provided on the pair of transparent substrates of the liquid crystal display element correspond to each other, are included. Thus, without fail, the lens portion of the panel are made to correspond to the part of the regions where the transparent electrodes of the liquid crystal display element correspond to each other, thereby facilitating the manufacture of the display device. In this way, when information is displayed on the liquid crystal display element, the information displayed on the liquid crystal display element can be represented three-dimensionally.

In the embodiment shown in FIGS. 48A to 48C, the lens portion (21) is provided on the panel (lens panel 13) by any one of integral molding, printing, and embossing.

According to the embodiment, the lens portion is provided on the panel by any one of integral molding, printing, and embossing. Thus, the lens portion can be provided on the panel with high accuracy. When the lens portion is formed by injection molding, the lens portion can be formed simultaneously with the molding of the panel. When the lens portion is formed by printing, the lens portion can be easily formed by using synthetic resin of an ultraviolet curable type as a material for the lens portion. When the lens portion is formed by embossing, the lens portion can be easily formed by pressing a mold for embossing onto the panel.

The entire disclosure of Japanese Patent Application No. Tokugan 2003-175731 filed on Jun. 20, 2003 including specification, claims, drawings and summary are incorporated herein by reference in its entirety.

What is claimed is:

1. A display device comprising:
    a liquid crystal display element which has a flat plate shape, and which includes a plurality of transparent electrodes, to which a voltage is applied, provided on transparent substrates;
    a substrate disposed at a back surface side of the liquid crystal display element; and
    a plurality of lens portions disposed on the substrate;
    wherein the plurality of lens portions and the plurality of transparent electrodes are positioned to correspond to each other and have a same or substantially similar shape as each other; and
    wherein external light passes through the transparent electrodes and is reflected at the lens portions to outside of the liquid crystal display element through the transparent electrodes such that information itself displayed by the liquid crystal display element is displayed three-dimensionally.

2. A display device comprising:
    a liquid crystal display element which includes a pair of transparent substrates, a pair of transparent electrodes on opposed surfaces of the pair of transparent substrates, and a liquid crystal provided between the pair of substrates;
    a substrate disposed at a back surface side of the liquid crystal display element; and
    a lens portion disposed on the substrate;
    wherein the lens portion is disposed to correspond to at least a part of regions where the pair of transparent electrodes of the liquid crystal display element correspond to each other, and the lens portion has a same or substantially similar shape as the pair of transparent electrodes in said at least the part of the regions; and
    wherein external light passes through the transparent electrodes and is reflected at the lens portion to outside of the liquid crystal display element through the transparent electrodes such that information itself displayed by the liquid crystal display element is displayed three-dimensionally.

3. The display device as claimed in claim 2, further comprising a decorative layer provided on at least one of a front surface side and a back surface side of the lens portion.

4. The display device as claimed in claim 3, wherein the decorative layer comprises at least one of a color layer and a metal layer.

5. The display device as claimed in claim 3, wherein the decorative layer comprises a polarizing film formed by a multi-layered film.

6. The display device as claimed in claim 2, wherein the liquid crystal comprises a liquid crystal polymer provided between the pair of substrates.

7. The display device as claimed in claim 2, further comprising a backlight member which illuminates the liquid crystal display element.

8. A display device comprising:
    a liquid crystal display element which includes a pair of transparent substrates, a pair of transparent electrodes on opposed surfaces of the pair of transparent substrates, and a liquid crystal provided between the pair of substrates;
    a substrate disposed at a back surface side of the liquid crystal display element; and
    a panel which includes a lens portion and is disposed on the substrate;
    wherein the lens portion is disposed to correspond to at least a part of regions where the pair of transparent electrodes of the liquid crystal display element correspond to each other, and the lens portion has a same or substantially similar shape as the pair of transparent electrodes in said at least the part of the regions and
    wherein external light passes through the transparent electrodes and is reflected at the lens portion to outside of the liquid crystal display element through the transparent electrodes such that information itself displayed by the liquid crystal display element is displayed three-dimensionally.

9. The display device as claimed in claim 8, wherein the lens portion is provided integrally with the panel.

10. The display device as claimed in claim 9, wherein the lens portion is formed in at least one of a projected shape and a recessed shape.

11. The display device as claimed in claim 10, wherein the lens portion has one of a semicircular vertical cross-section and a polygonal vertical cross-section.

12. The display device as claimed in claim 9, wherein the lens portion has a shape including a top surface and a rising surface, and a decorative layer is provided on at least one of the top surface and the rising surface.

13. The display device of as claimed in claim 9, wherein the lens portion is colored in a semi-transmissive state.

14. The display device as claimed in claim 9, wherein the lens portion comprises a plurality of types of lens parts which differ in at least one of shape and color and which are combined and arranged two-dimensionally.

15. The display device as claimed in claim 9, wherein the lens portion comprises a plurality of types of lens parts which differ in at least one of shape and color and which are combined and stacked on each other.

* * * * *